United States Patent [19]

Kapeghian et al.

[11] 4,245,307
[45] Jan. 13, 1981

[54] CONTROLLER FOR DATA PROCESSING SYSTEM

[75] Inventors: Charles L. Kapeghian, Vincentown; Charles C. Garman, Palmyra; Paul R. Malnati, Delran, all of N.J.

[73] Assignee: Formation, Inc., Mount Laurel, N.J.

[21] Appl. No.: 75,419

[22] Filed: Sep. 14, 1979

Related U.S. Application Data

[63] Continuation of Ser. No. 836,071, Sep. 22, 1977, abandoned.

[51] Int. Cl.³ .............................................. G06F 13/00
[52] U.S. Cl. .................................................... 364/200
[58] Field of Search ... 364/200 MS File, 900 MS File

[56] References Cited
U.S. PATENT DOCUMENTS

| | | | |
|---|---|---|---|
| 3,820,079 | 6/1974 | Bergh | 364/200 |
| 3,934,232 | 1/1976 | Curley | 364/200 |
| 3,999,163 | 12/1976 | Levy | 364/200 |
| 4,016,541 | 4/1977 | Delagi | 364/200 |
| 4,028,663 | 6/1977 | Royer | 364/200 |
| 4,055,851 | 10/1977 | Jenkins | 364/200 |
| 4,067,059 | 1/1978 | Derchak | 364/200 |

Primary Examiner—James D. Thomas
Attorney, Agent, or Firm—Allan Ratner

[57] ABSTRACT

A controller for at least one secondary storage device for use in a data processing system having a system bus which accommodates a device or a CPU that first acquires control, a device bus that has the same address, data and control format as the system bus and a cache bus which maintains its own timing for address and data signals. The controller has means for transferring the control signals between the device bus and the system bus to establish control over the system bus by the secondary storage device. The data, address and control signals are transferred between the device bus and the cache bus in accordance with the cache bus timing.

15 Claims, 22 Drawing Figures

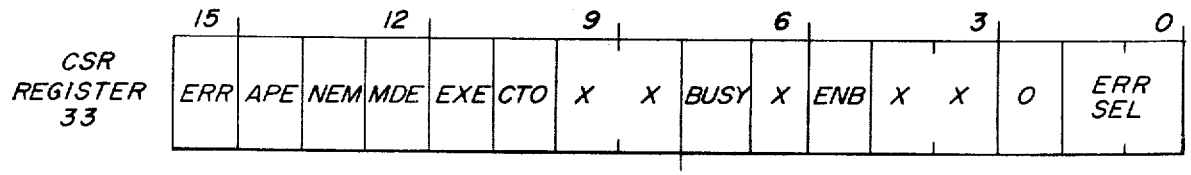
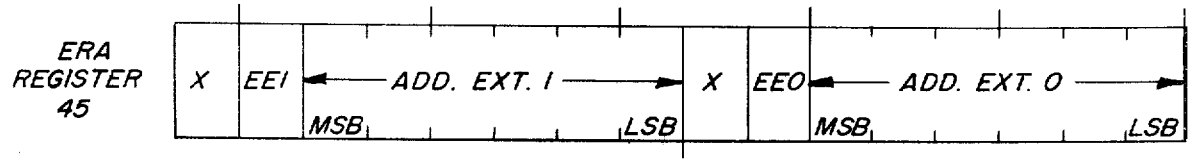
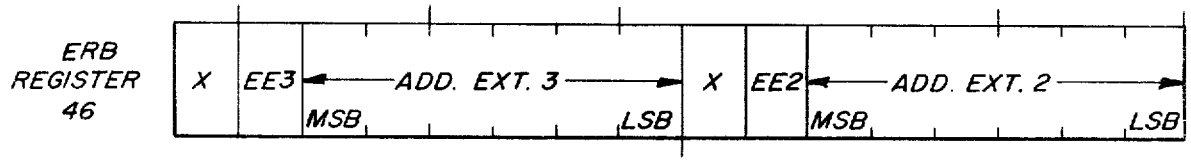
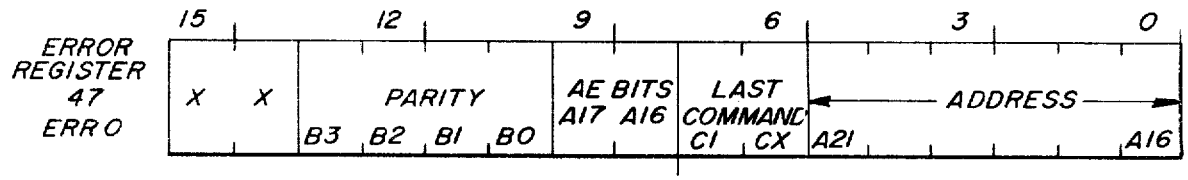
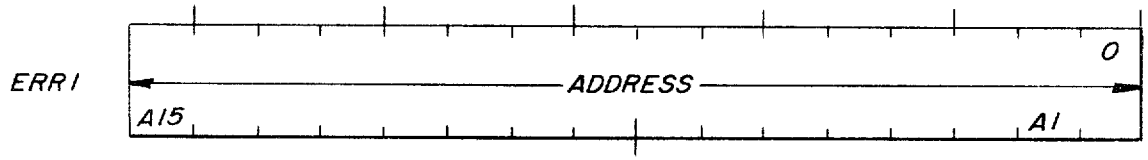
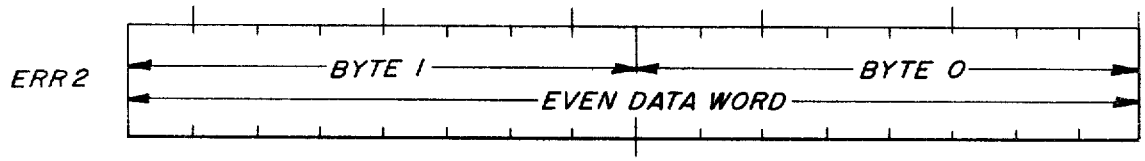
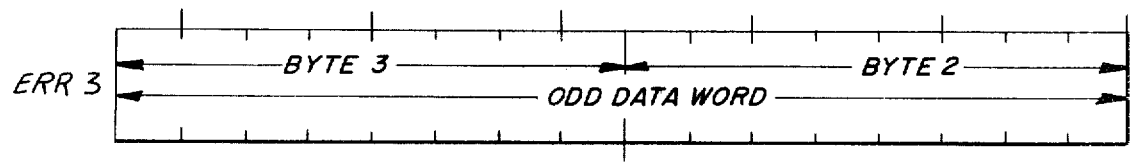
X NOT USED. MAY BE READ AS A (0 OR 1)
FIG. 3

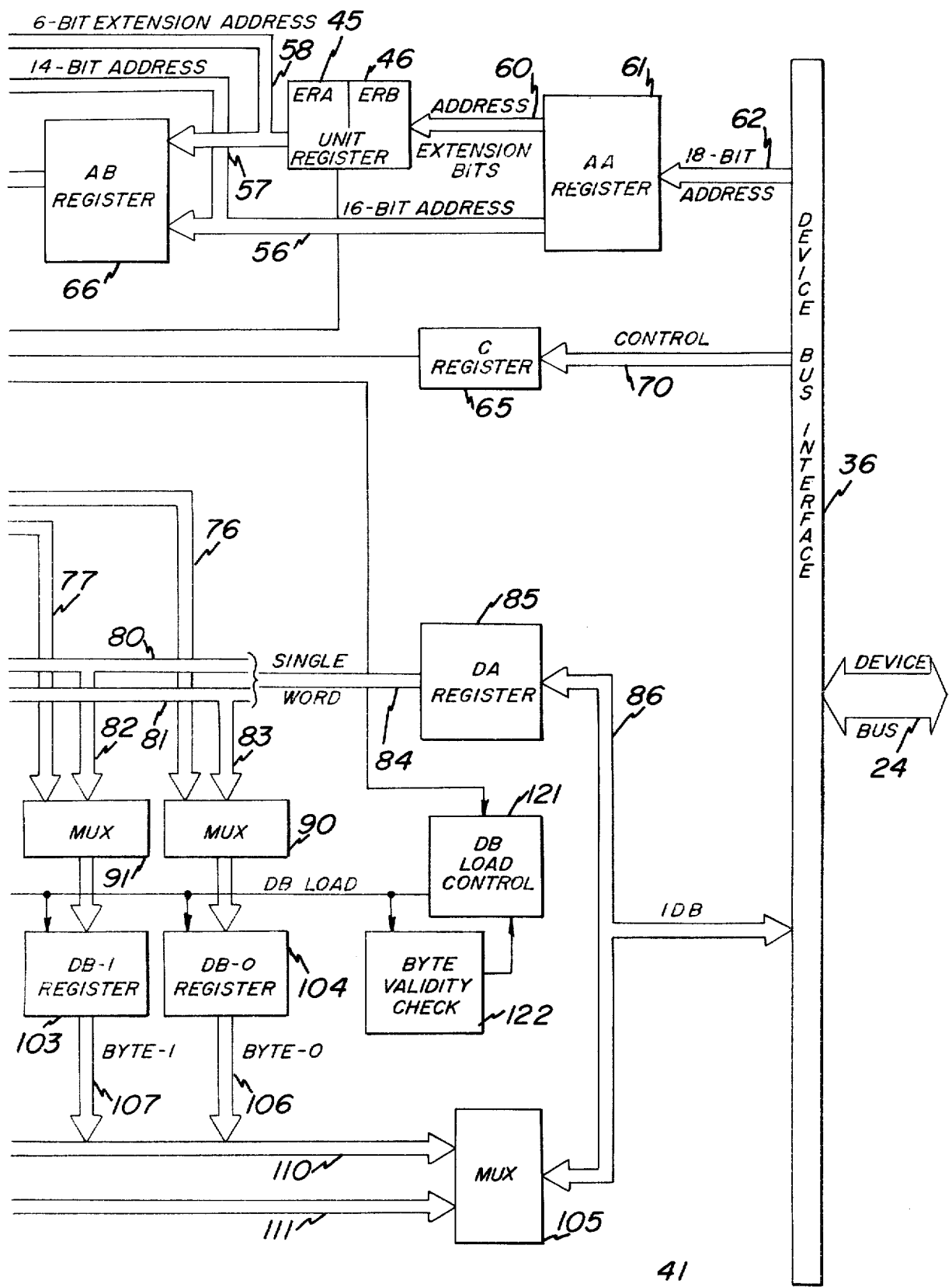
FIG. 4B  DATA TRANSFER LOGIC

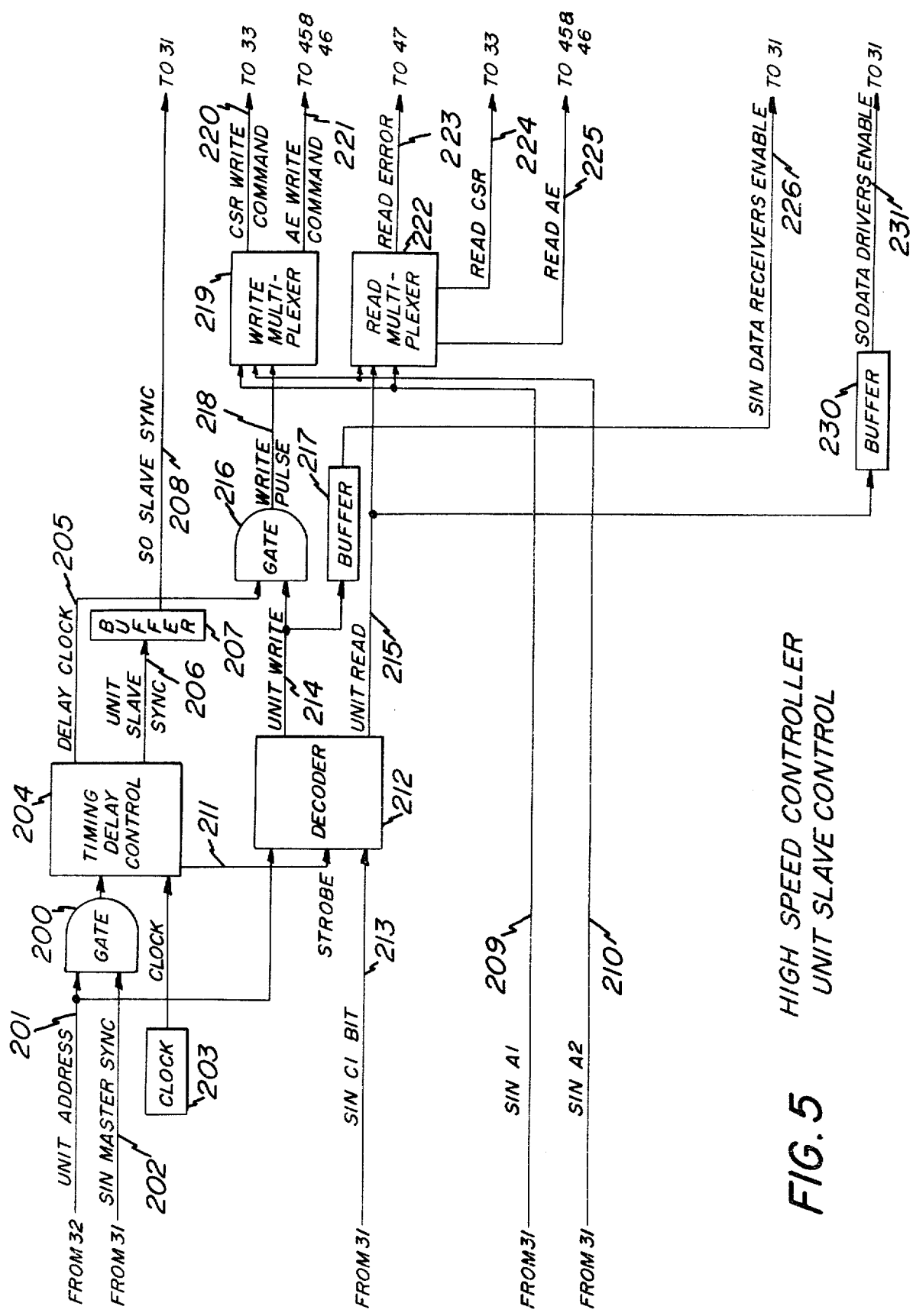
FIG. 5    HIGH SPEED CONTROLLER
UNIT SLAVE CONTROL

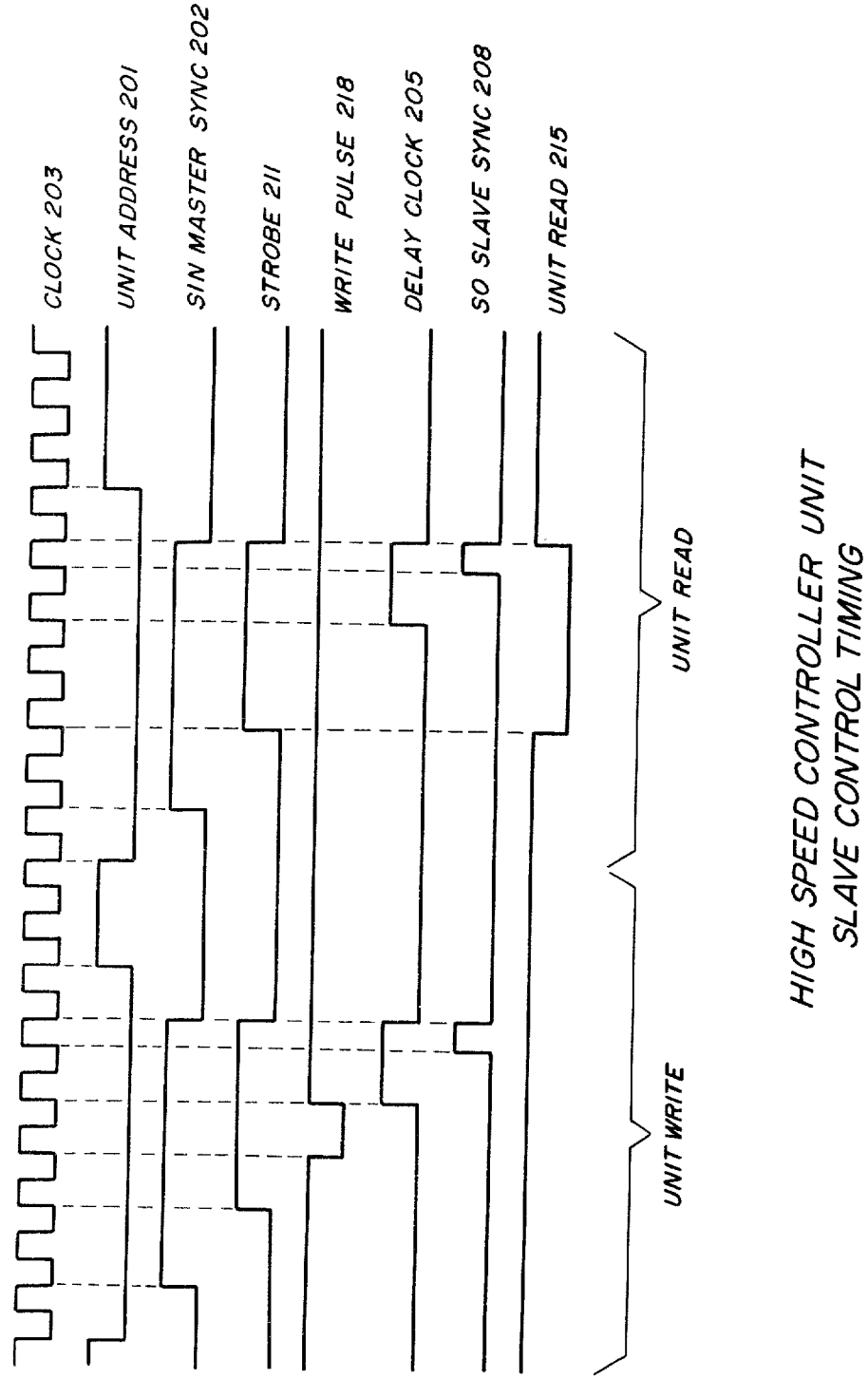
FIG. 6 HIGH SPEED CONTROLLER UNIT SLAVE CONTROL TIMING

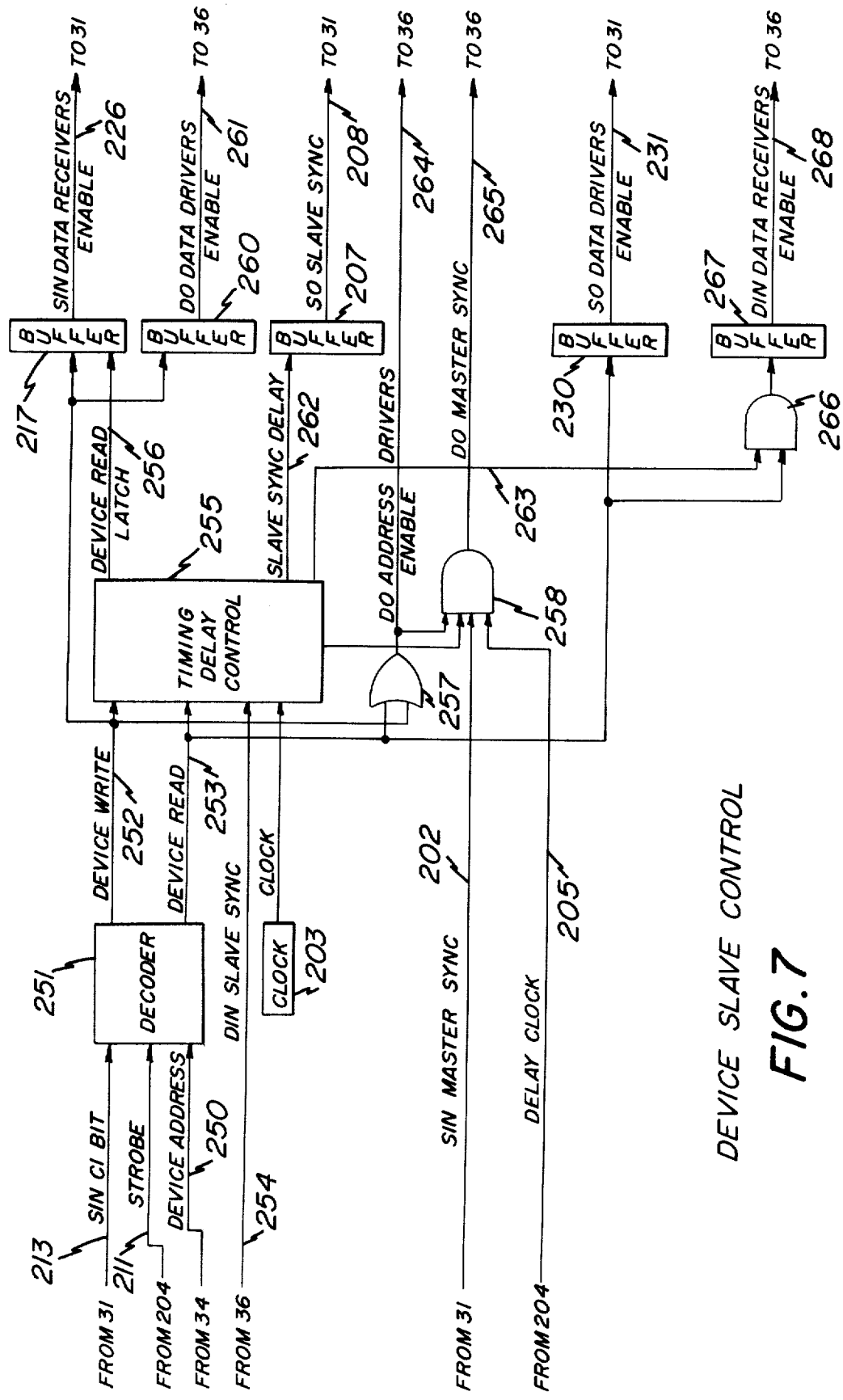
FIG. 7 DEVICE SLAVE CONTROL

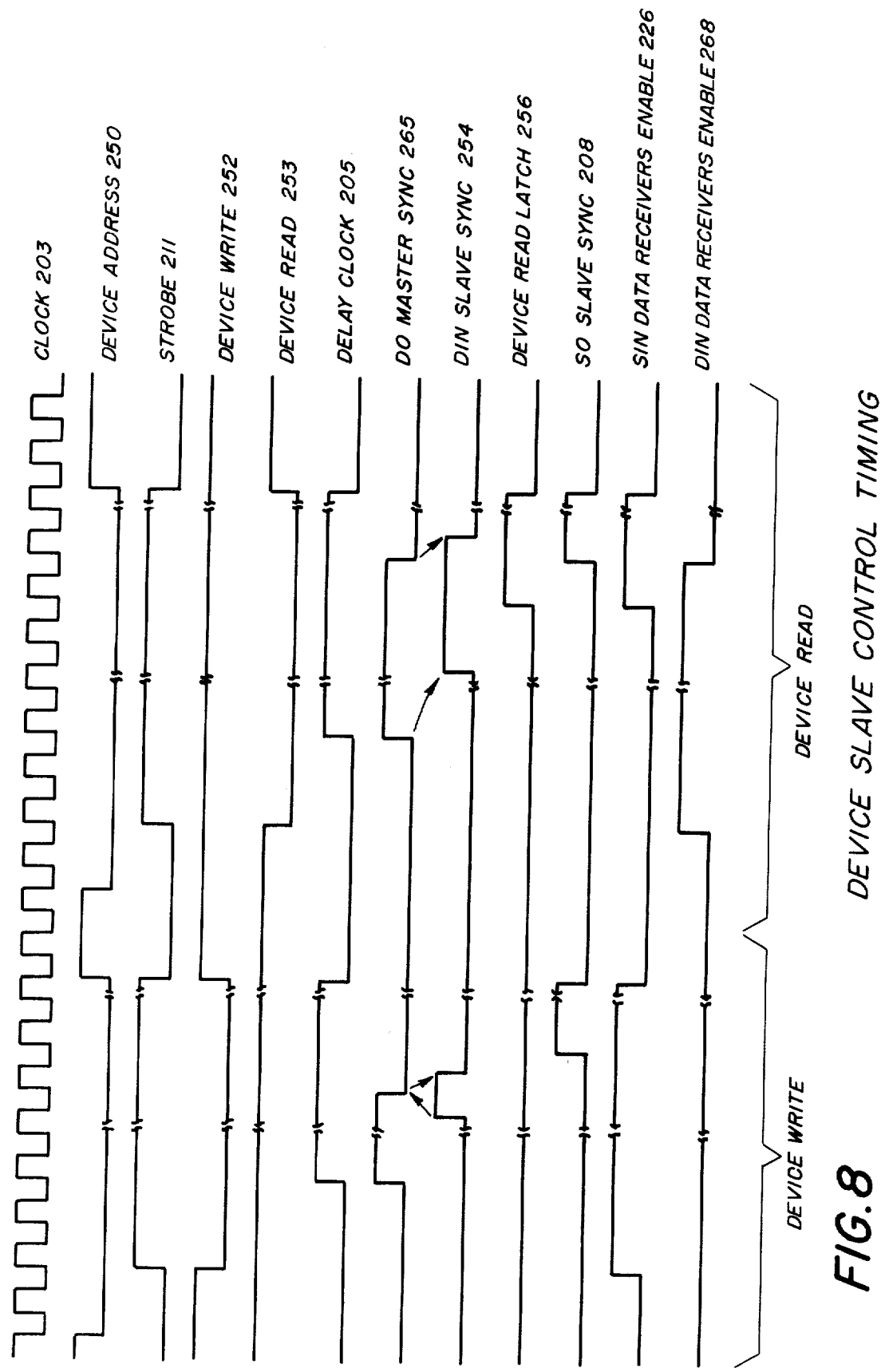

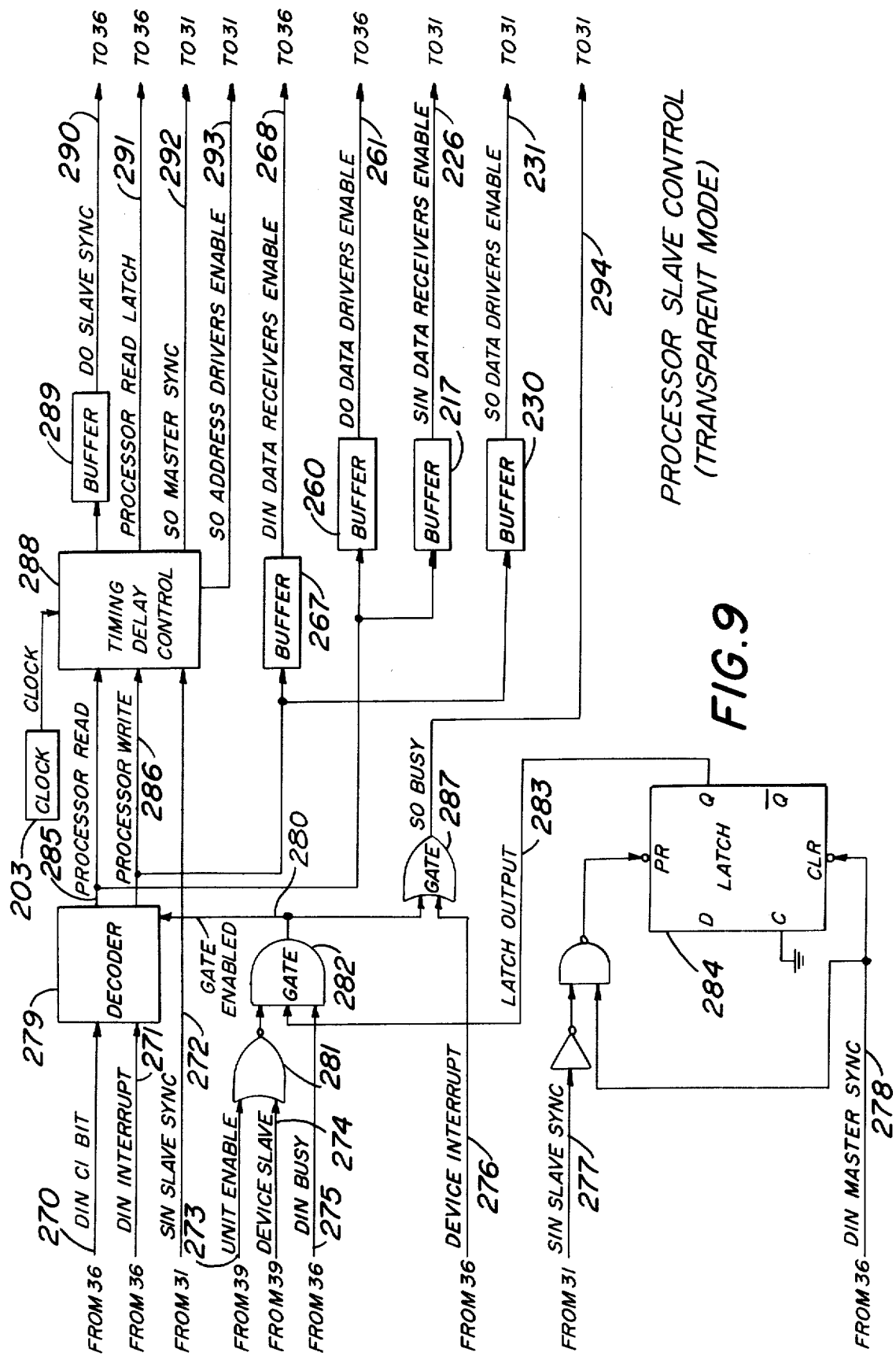

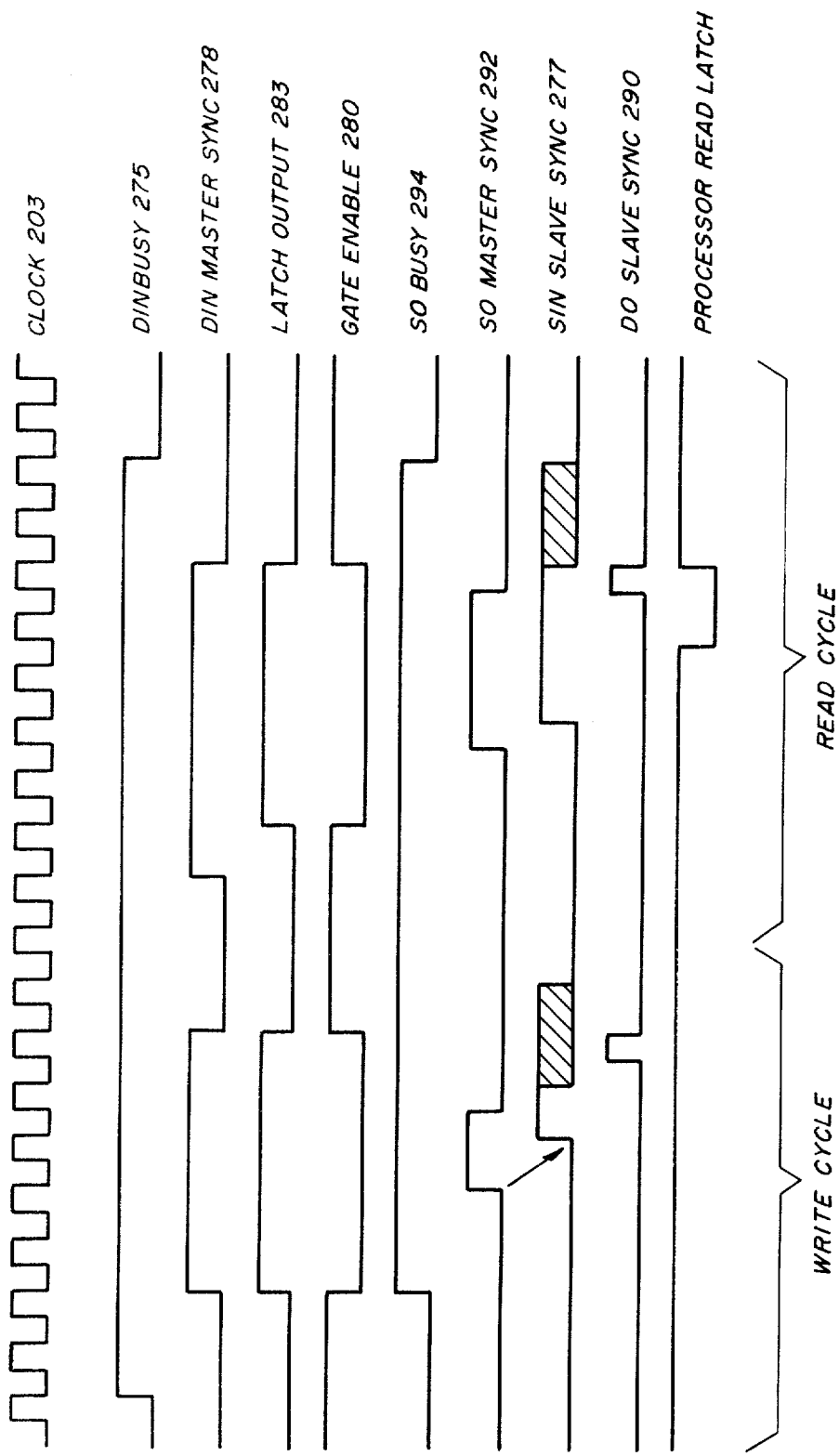
FIG. 10  PROCESSOR SLAVE CONTROL TIMING

MEMORY CYCLE CONTROL

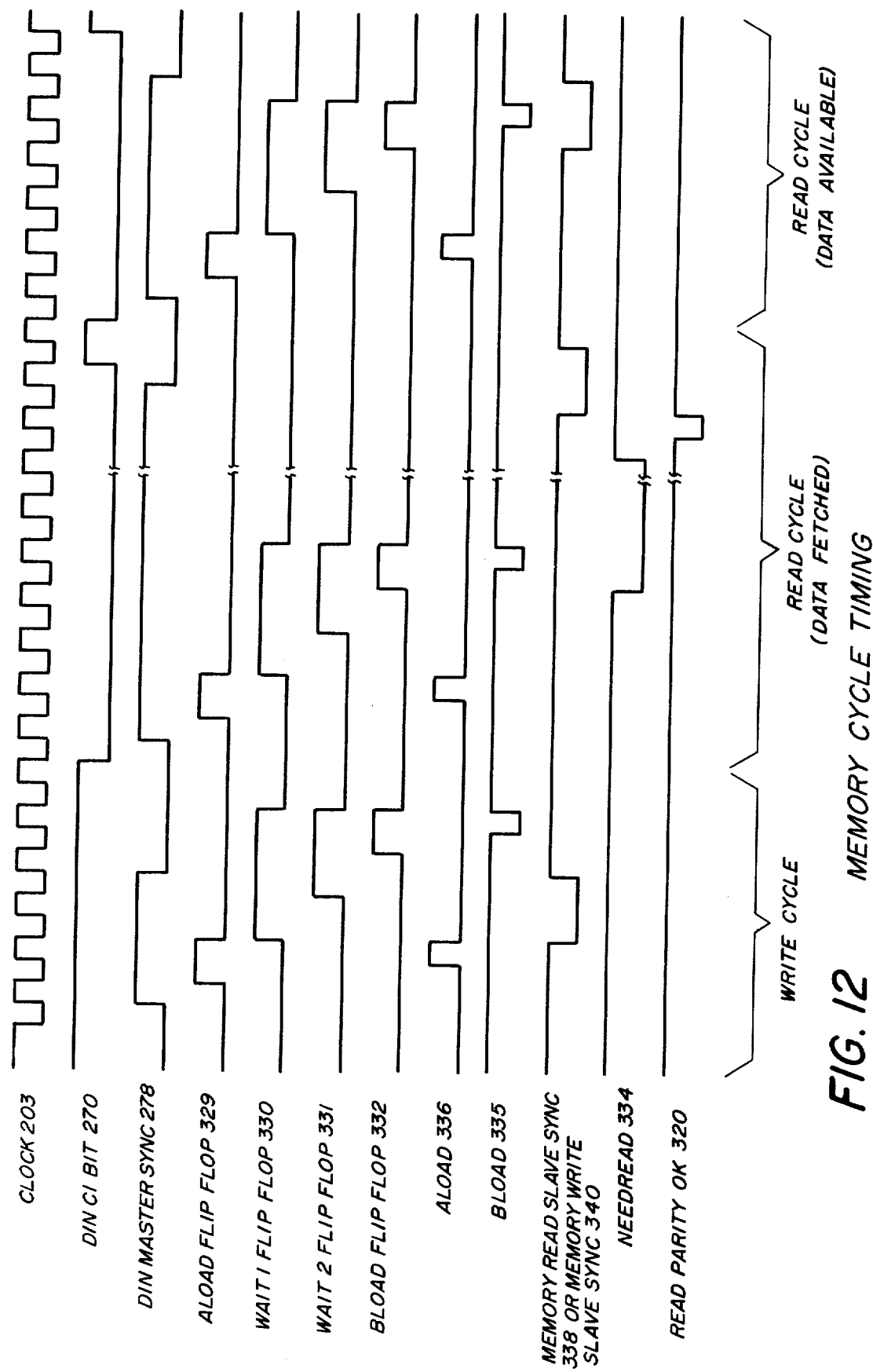
FIG. 12  MEMORY CYCLE TIMING

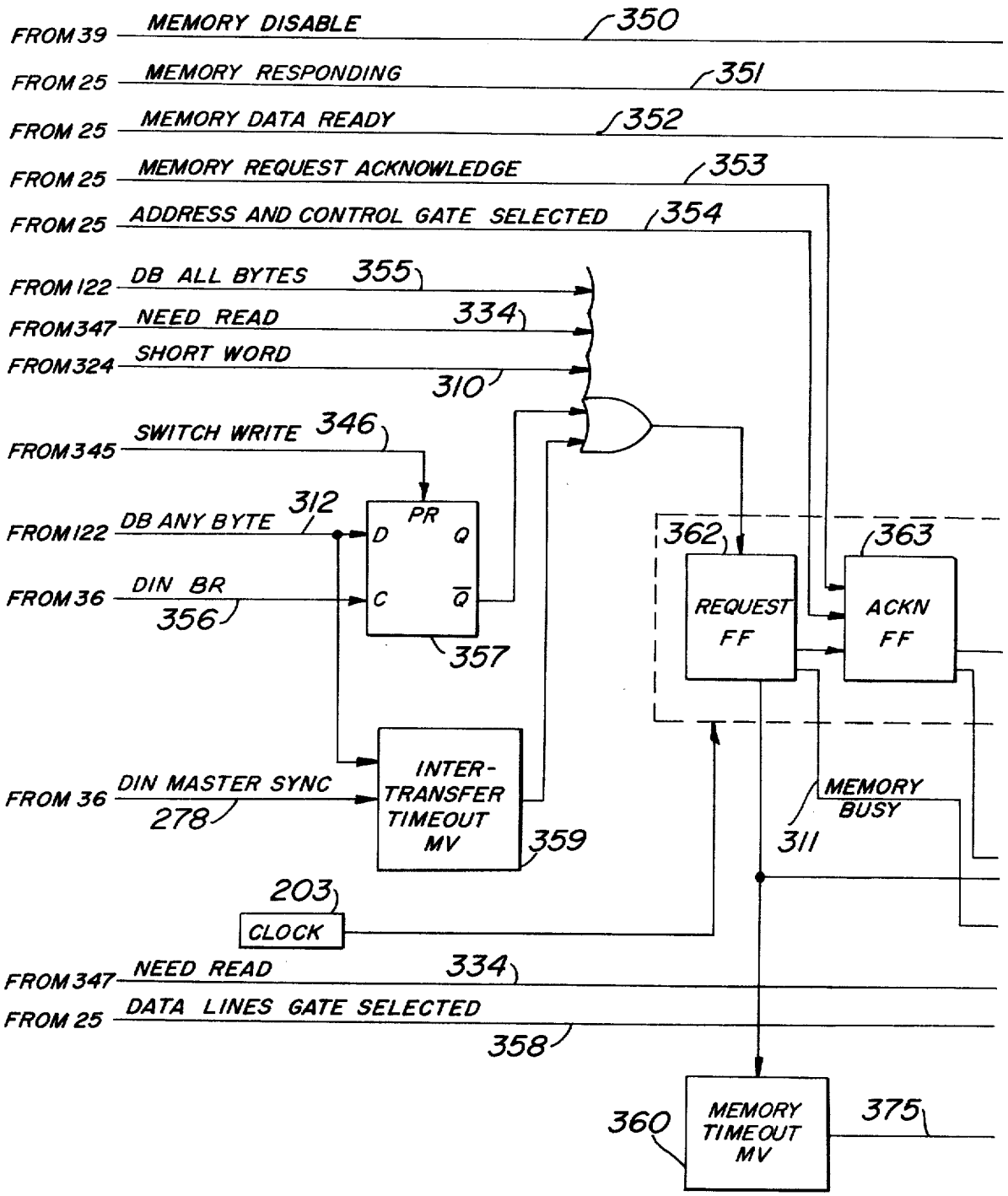
FIG. 13A    MEMORY INTERFACE CONTROL

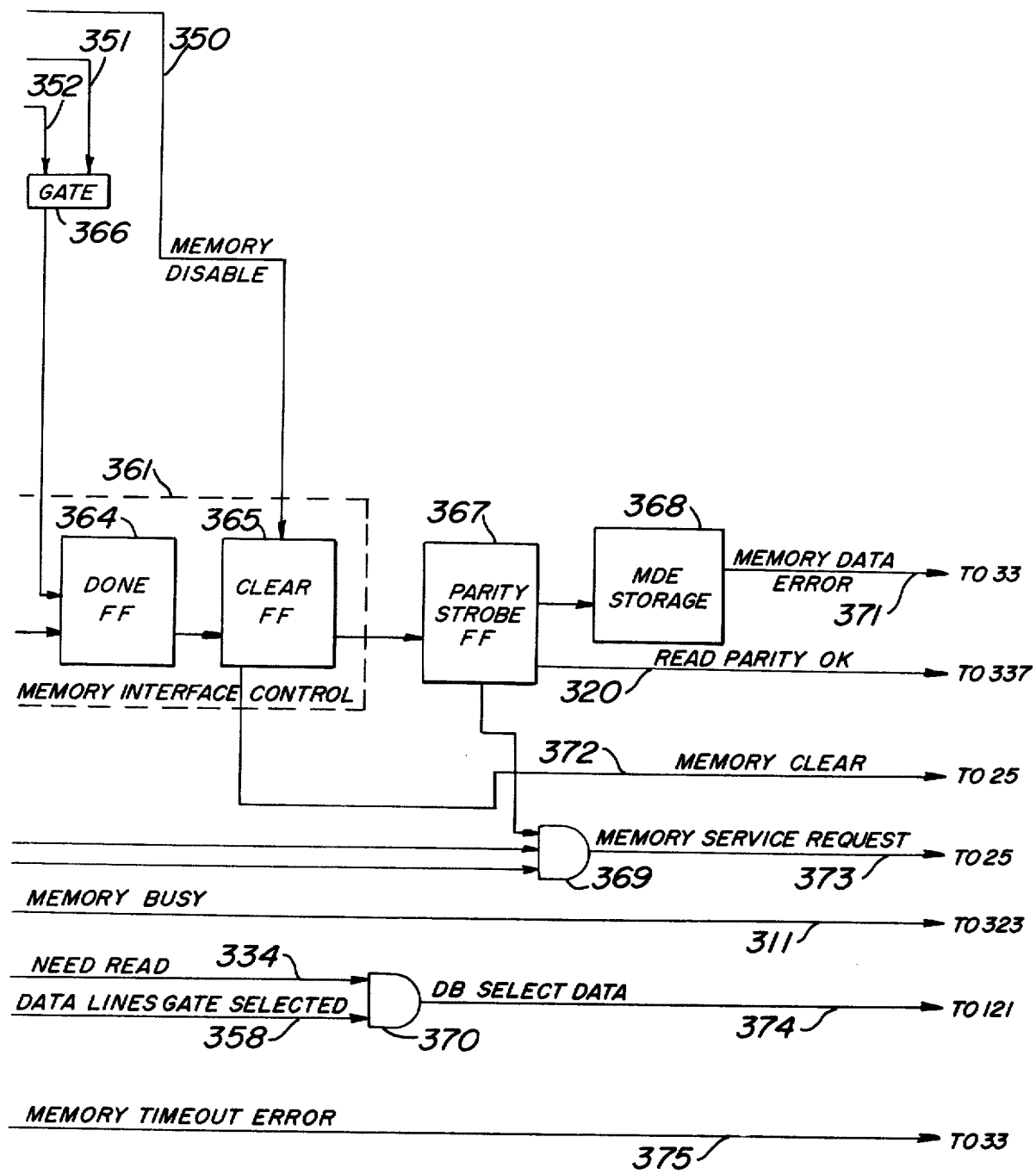
FIG. 13B   MEMORY INTERFACE CONTROL

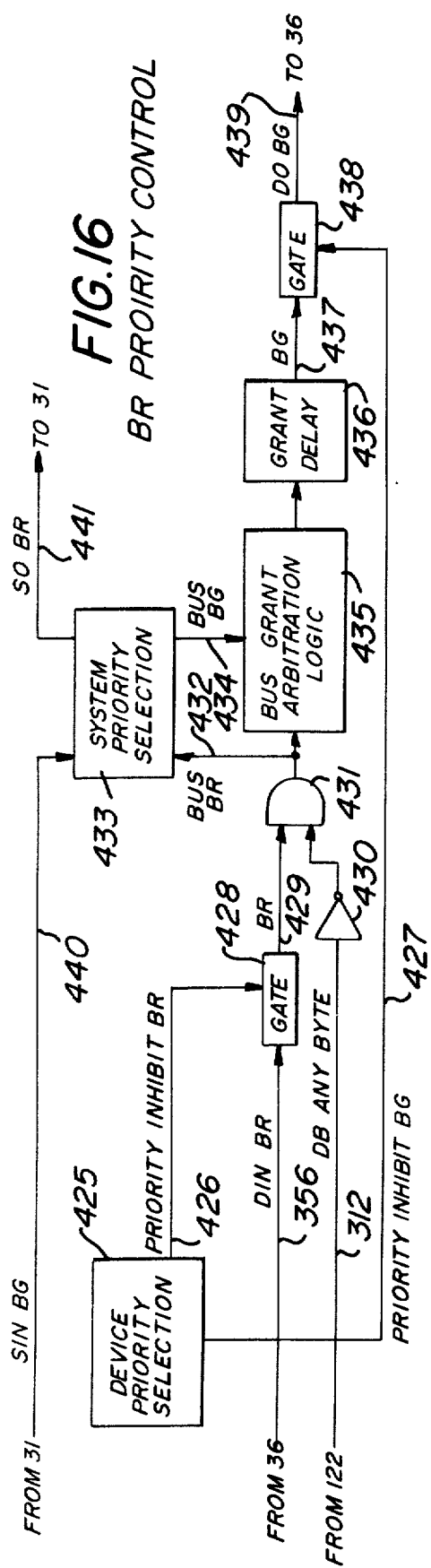
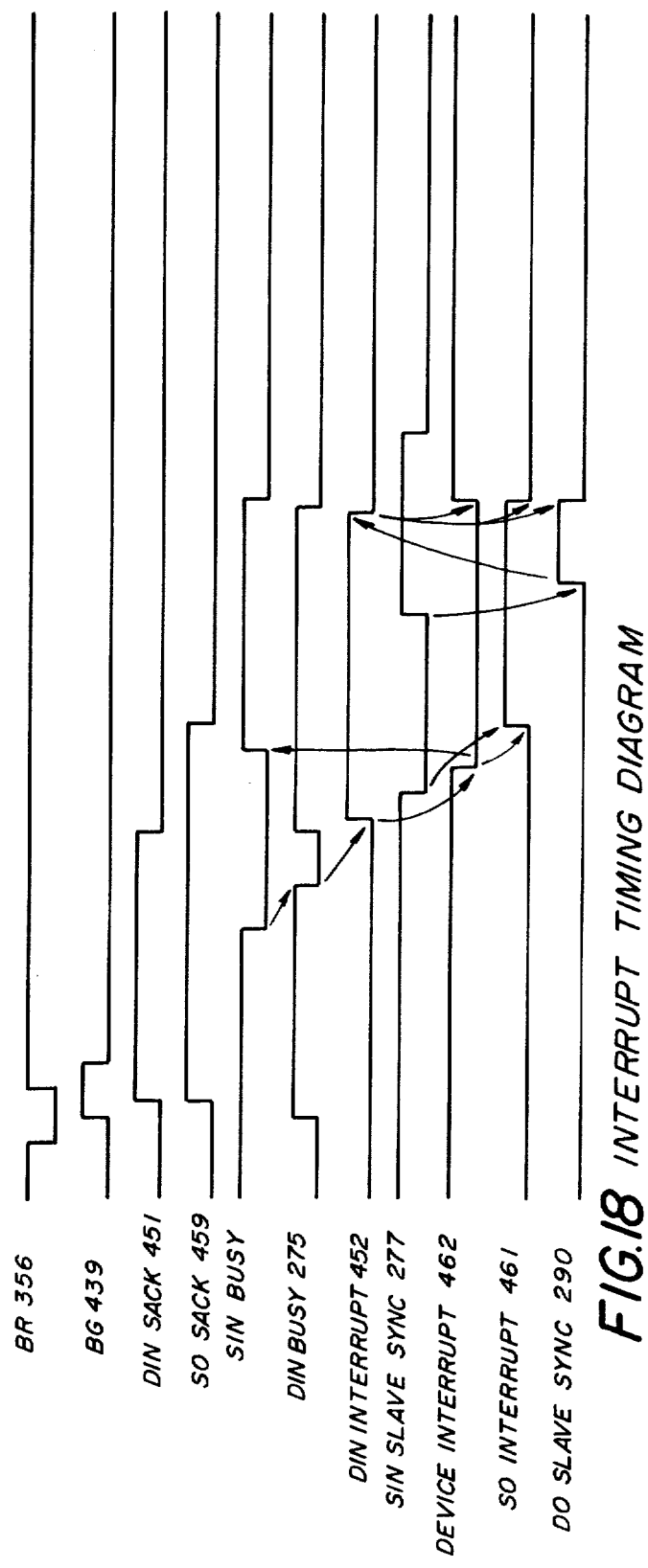
FIG. 16 BR PRIORITY CONTROL
FIG. 18 INTERRUPT TIMING DIAGRAM

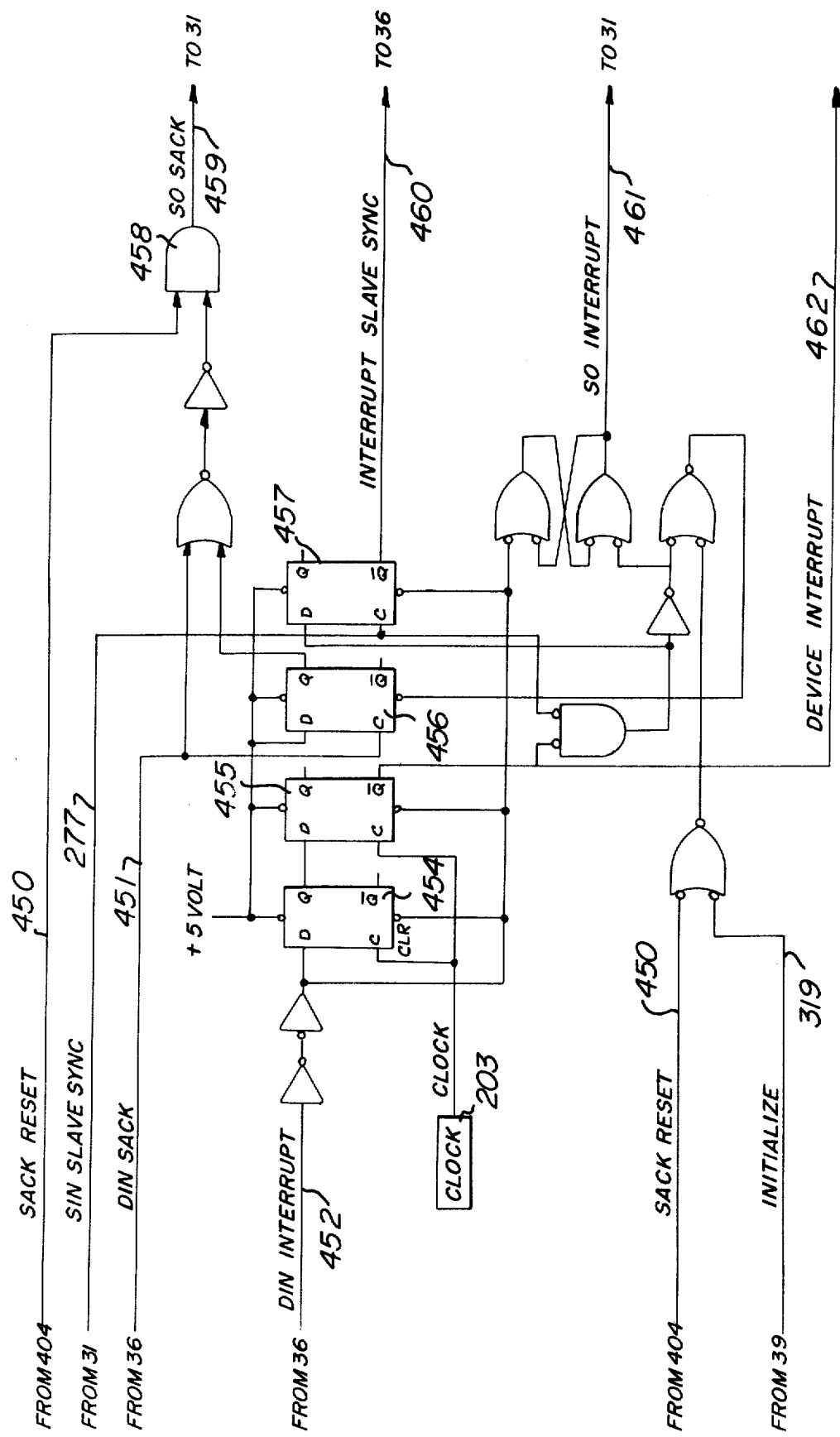
FIG.17 INTERRUPT CONTROL

CONTROLLER FOR DATA PROCESSING SYSTEM

This a continuation, of application Ser. No. 836,071, filed Sept. 22, 1977, now abandoned.

TABLE OF CONTENTS

Abstract of the Disclosure
Background of the Invention
  I. Field of the Invention
  II. Prior Art
Summary of the Invention
Brief Description of the Drawings
Description of Illustrative Embodiments
  I. General Description
    A. Device Bus 24 to System Bus 23 Communication
    B. Device Bus 24 to Cache Bus 25 Communication
      1. Mapping
      2. Management Function
  II. Controller General Description Table 1—High Speed Controller Registers
  III. Data Transfer Logic
  IV. Unit Slave Control
  V. Device Slave Control
  VI. Processor Slave Control
  VII. Memory Cycle Control
  VIII. NPR Cycle Control
  IX. BR Priority Control
  X. Interrupt Control
Table of Components

BACKGROUND OF THE INVENTION

I. Field of the Invention

This invention relates to data processing systems and more specifically to a controller for controlling and coupling at least one peripheral unit to a central processing unit and a high speed memory unit.

II. Prior Art

Data processing systems usually have several secondary storage devices for recording data on or reading data from a recording medium. Such a medium has included a magnetic drum memory device, a magnetic tape device or a disk memory device. It is often desirable to transfer data from one of these devices to a high speed memory unit, or conversely, to transfer data from the high speed memory unit to the device.

In prior systems, controller devices have been developed to control the secondary storage facilities and permit them to transfer data between themselves and the high speed memory unit. Such transfer of data, however, was relatively slow, inefficient and had to be accomplished by way of the data processing system's main bus. The main bus, designated as the system bus, interconnects all controller devices, the high speed memory unit and the central processing unit. Since transfer of data has been by way of the system bus, all other bus activities had to cease during such data transfer.

To free the system bus during such data transfers new busses have been developed, designated as memory busses. Such new memory or cache busses have been designed to handle all data transfers between secondary storage facilities and the high speed memory unit. However, this was accomplished only with drastic changes to the data processing system. The controllers had to be redesigned to accommodate the new memory bus. In addition, the bus connecting the secondary storage facilities with the controller also had to be redesigned.

This has led to waste of data processing resources since a user who already owned secondary storage facilities with controllers, had to revamp his entire system. New controller devices had to be purchased, and new interfaces between the secondary storage facilities and controller devices had to be implemented. If this was not done, the user could not take advantage of the memory bus.

Therefore, it is an object of this invention to allow data transfers between existing secondary storage facilities and a high speed memory unit by way of the memory bus.

Another object of this invention is to maintain the interfaces between existing controller and the system bus. Thus, all interchanges of signals or handshaking operations are performed as they have been in prior systems, with the addition of direct, high speed memory transfer by way of a memory bus.

SUMMARY OF THE INVENTION

A controller system for controlling at least one secondary storage device for use in a data processing system having a CPU, a main memory and a high speed memory. A system bus handles data, address and control signals and accommodates a device or the CPU itself that first acquires control until that device or CPU relinquishes control. A device bus in the form of a single bus has the same address, data and control formats as the system bus. A cache bus carries the data, address and control signals and maintains its own timing for address and data signals. The controller system comprises means for transferring control signals between the device bus and the system bus to establish control over the system bus by the secondary storage device. There is further provided means for transferring data, address and control signals between the device bus and the cache bus in accordance with the cache bus timing. In this manner, the controller system transfers signals between the device bus and system bus where these busses have the same format while at the same time transferring data between the device bus and the cache bus.

BRIEF DESCRIPTION OF THE DRAWINGS

FIG. 3 illustrates the configuration of unit registers shown in FIG. 2;

FIGS. 4A-B taken together illustrate in somewhat more detail the data transfer logic of FIG. 2;

FIG. 5 illustrates in more detail and in block form unit slave control of FIGS. 2 & 4A-B;

FIG. 6 illustrates waveforms helpful in understanding the operation of FIG. 5;

FIG. 7 illustrates in more detail and in block form device slave control of FIGS. 2 & 4A-B;

FIG. 8 illustrates waveforms helpful in understanding the operation of FIG. 7;

FIG. 9 illustrates in more detail and in block form processor slave control of FIGS. 2 & 4A-B;

FIG. 10 illustrates waveforms helpful in understanding the operation of FIG. 9;

FIG. 12 illustrates waveforms helpful in understanding the operation of FIGS. 11A-B;

FIG. 13A-B illustrate in more detail and in block form memory interface control of FIGS. 2 & 4A-B;

FIG. 16 illustrates in more detail and in block form BR priority control of FIGS. 2 & 4A-B;

FIG. 17 illustrates in more detail and in block form interrupt control of FIGS. 2 & 4A-B;

FIG. 18 illustrates waveforms helpful in understanding the operation of FIG. 17.

DESCRIPTION OF ILLUSTRATIVE EMBODIMENTS

General Description

Figure 1:
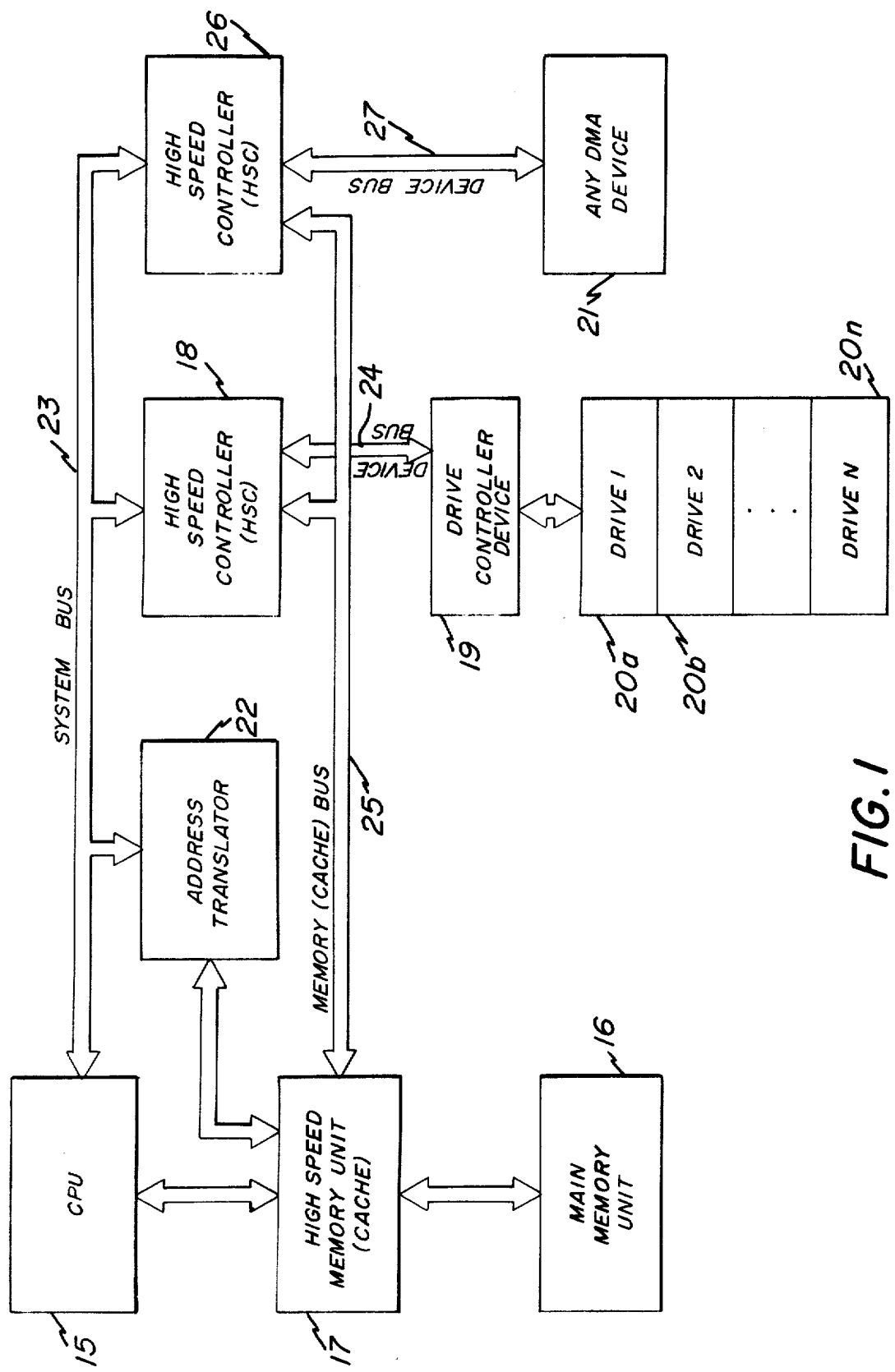
FIG. 1 illustrates in basic block diagram form a data processing system and a controller embodying the invention.

FIG. 1 shows the general configuration of a data processing system comprised of central processing unit (CPU) 15; main memory unit 16, normally a random access memory unit; and high speed memory or cache 17, a volatile memory which is the sole master of main memory 16. Also shown are two high speed controllers 18 and 26, controller device 19, its associated drives 20a, 20b, etc. and any other direct memory access (DMA) device 21.

As shown in FIG. 1, all information is transferred on busses which interconnect the units. The busses connecting devices 19 and 21 to high speed controllers 18 and 26 are known as device busses 24 and 27 respectively. The bus connecting controllers 18 and 26 to CPU 15 and address translator 22 is known as system bus 23. Finally, the bus connecting controllers 18 and 26 to high speed memory unit 17 is known as memory or cache bus 25. Since controllers 18 and 26 are similar, as are device busses 24 and 27, all discussions hereafter will be referenced to controllers 18 and device bus 24. CPU 15, units 16, 17 and 22 and busses 23 and 25 may be a PDP 11/70 made by Digital Equipment Corp.

As will be explained later, high speed controller 18 provides a powerful tool to the data processing system shown in FIG. 1. It provides a two-fold task. The first task is to permit controller device 19 to access system bus 23 by way of device bus 24. In fact, device 19 functions as if device 19 was itself connected to system bus 23. Stated differently, controller 18 provides the appropriate interface which effectively makes device bus 24 synonymous to system bus 23. The second task of controller 18 is to permit device 19 to have a direct access to high speed memory 17. This permits very high speed data transfer from device 19 to memory 17, and vice versa. By allowing controller 18 to act as the mediator between device 19 and memory 17, high speed data transfers may be made without decreasing the availability of other activities on system bus 23. It will be understood that cache 17 operates in its usual manner with controller 18 as with any controller compatible with cache bus 25. Specifically, cache 17 is effective to just transfer data between cache bus 25 and memory unit 16 and cache 17 does not actually store any data. This transfer is meant when it is described herein that data is stored or written to or read from memory 17. It is also important to point out that cache 17 itself maintains the timing on cache bus 25 with respect to address signals and data signals and never gives up such control. This is to be compared with system bus 23 which can accommodate any device 19, 21 or CPU 15 itself that first acquires control until that device or CPU relinquishes that control.

Both device bus 24 and system bus 23 are bidirectionally conducting media because information is transferred to and from units over the busses. As shown more specifically in FIGS. 4A-B, each bus comprises several wires which can be classified into three groups. One group of wires conducts data signals, while another conducts address signals. Both groups conduct signals bidirectionally. These signals are transferred in parallel, as distinguished from serial transmission. The third group of wires, the control group, consists of signals, some of which are bidirectionally conducting, while others are unidirectional. These signals are described later. It must be emphasized that it is this invention which permits device 24 and system bus 23 to have identical groups of wires and still function properly in the data processing system shown in FIG. 1.

Drives 20a, 20b, etc. are secondary storage devices which may include a recording medium for recording data on or reading data from the recording medium. For example, the medium may consist of a magnetic tape unit or disk memory unit. It may be desired to transfer data stored in one of these drives to high speed memory 17, or conversely, to transfer data stored in memory 17 to one of these drives. Device 19 acts as a controller of these drives, ensuring that only one drive is activated and transferring or receiving data on device bus 24.

Device Bus 24 to System Bus 23 Communication

Communication on system bus 23 and device bus 24 is in the form of a master-slave relationship. At any point in time, there is one device, by way of example device 19, that has control of system bus 23. This controlling device is designated as master. The master device controls the bus when communicating with another device, such as CPU 15. In this situation, CPU 15 is designated as slave. Another example is device 19, as master, transferring data to memory 17, as slave. Still another example is CPU 15 fetching register information from device 19; at this instant, CPU 15 is master and device 19 is slave. The master-slave relationship is dynamic and changes based on the usage demands of the devices in the data processing system. Since it is possible for two devices, by way of example devices 19 and 21, to request use of system bus 23 simultaneously, there is a priority structure to determine which device gets control of the bus. The device with the higher priority will receive control.

Communication on system bus 23 and device bus 24 is interlocked so that for each control signal issued by the master device, there must be a response from the slave in order to complete the transfer. Consider, for example, that CPU 15 as master must transfer information to device 19. Initially, the address for device 19, the control signals identifying the type of operation to be performed, and the data are transferred onto system bus 23. To establish itself as master, CPU 15 produces a master synchronization signal onto system bus 23. High speed controller 18, acting as a mediator between system bus 23 and device bus 24, checks the address placed on system bus 23 to determine whether the address, in fact, belongs to device 19. If it does, controller 18 places the same address, control and data onto device bus 24. The master synchronization signal is retimed by controller 18 and also placed onto device bus 24. When device 19 receives the master synchronization signal, decodes the address and bus control signals, it accepts the data on device bus 24. This is followed by device 19 transmitting a slave synchronization signal back to device bus 24. Controller 18 again retimes the slave synchronization signal and places it onto system bus 23. The master unit, CPU 15, responds to the slave synchronization signal by stopping transmission of the master synchronization signal and then the address, control and data signals. When the slave unit, device 19, senses that the master unit has stopped transmitting the master synchronization signal, it stops transmitting the slave synchronization signal. The bus operation is thus completed. The bus operation in this example is designated as a device write operation. The operation is performed on system bus 23, inside controller 18 and on device bus 24. It is controller 18 which provides the necessary timing and delays of signals to permit this operation to occur. In fact, device 19 and CPU 15 need not make any provisions to accommodate controller 18; stated differently, controller 18 is transparent to both device 19 and CPU 15.

As another example, consider that device 19 must transfer information to unit 16; this operation is designated as a processor write operation and is transferred by way of device bus 24, controller 18, bus 23, translator 22, memory 17 to memory 16. In this situation, device 19 must become master of system bus 23. Consequently, device 19 makes a request to become master. The bus request is placed onto device bus 24 and relayed to system bus 23 by way of controller 18. If device 19 has sufficient priority, the request is accepted by CPU 15, which then generates a bus grant signal back onto system bus 23. Again, controller 18 acting as a mediator, transfers the bus grant signal to device 19 by way of device bus 24. At this time, device 19 does not control the system. When controller 18 senses the absence of signals on system bus 23, it notifies device 19, which then assumes control of the bus. Once device 19 assumes control, it places the address of unit 16, the control signals identifying the type of operation and the data onto device bus 24. The master synchronization signal is also placed onto device bus 24. Controller 18, acting as the mediator between both busses, places the same signals, appropriately retimed, onto system bus 23. Once all the information is transferred, CPU 15 generates a slave synchronization signal, which is relayed to device 19. This completes the processor write cycle. In most situations, control is returned to CPU 15, unless another device, such as device 21, has been granted next control of the bus.

Device Bus 24 to Cache Bus 25 Communication

Mapping

As mentioned earlier, the second task of controller 18 is to permit device 19 to access memory 17 for fast read and write operations. In this situation, controller 18 acts as the mediator between device bus 24 and memory bus 25. The advantage here is that system bus 23 is undisturbed. In order to address memory 17 directly, a 22-bit address is required. Device 19, however, is only capable of outputting an 18-bit address. This inconsistency is rectified by controller 18. As will be explained in detail later, controller 18 provides a mapping function to convert an 18-bit address into a 22-bit address. Thus, an 18-bit address placed onto device bus 24 by device 19 is converted into a 22-bit address by controller 18. The 22-bit address is then placed onto bus 25 by controller 18. When memory 17 accepts the remapped address, it decodes the address to determine from which storage location is information to be retrieved and sent to device 19; or conversely, to which location is information sent by device 19 to be stored.

Since memory 17 controls the timing on memory bus 25, controller 18 must accommodate the timing established by memory 17. Thus, control signals transmitted by memory 17 onto memory bus 25 are decoded by controller 18 to determine when the data transfer is to occur. Thus, data that has been stored in controller 18 is not transferred to memory bus 25 until memory 17 is ready to accept it. Similarly, data must be accepted by controller 18 whenever memory 17 is ready to transmit it.

Management Function

Furthermore, controller 18 provides a management function to control the transfer of the data between device 19 and memory 17. The management function is needed because device 19 can only handle 16-bits of data at a time, whereas memory 17 handles 32-bits of data simultaneously. Consider for example, a memory write operation in which device 19 must store data into memory 17. Device 19 places an 18-bit address, control signals and a 16-bit data word onto device bus 24. Controller 18 converts the 18-bit address into an appropriate 22-bit address, so that data can be transferred to the correct location in memory 17. At this time, no data is transferred to memory bus 25. Instead, the 16-bit data word is stored inside controller 18. When the 16-bit data word disappears from device bus 24, device 19 places a second 16-bit data word, along with address and control signals, onto device bus 24. If the second address is similar to the first, controller 18 senses that the second data word and the first data word are part of the same 32-bit word to be written into memory 17. Both words, designated as a double word, are then placed into memory bus 25 and transferred to the appropriate location in memory 17. This operation is repeated until all desired information is written into memory 17.

A memory read operation, in which data is transferred from memory 17 to device 19 operates in a similar manner. When data is placed on memory bus 25 by memory 17, it is in a 32-bit or double word format. Controller 18 stores the double word, and then places the first 16-bits onto device bus 24. Whenever device 19 requests a 16-bit word, it places the 18-bit address on bus 24 and that address is transformed into a 22-bit address. The 22-bit address is compared with the 22-bit address of the double word now stored in controller 18. If the upper 20 bits are the same, it is understood that controller 18 already has the information that is being requested and accordingly, controller 18 outputs the data. If the upper 20 bits are not the same, then the above described retrieval cycle is initiated. This operation is explained later in detail.

It should be pointed out that as part of this operation the data words transferred from device 19 to memory 17 need not be complete double words. Instead, 8-bits of a word, designated as a byte, can also be transferred. When this occurs, a byte is accepted by controller 18 and transferred to memory 17 as a single word comprised of the byte and a string of zero bits.

In order to more fully appreciate how the foregoing advantages of this invention are obtained the following discussion describes the high speed controller in terms of its operation in a data processing system in more detail. This description first indicates how high speed controller 18 operates. Next, the controller's ability to transfer data between device 19 and memory 17 is described in detail. Finally, the handshaking operations required between device 19 and system bus 23 is also discussed.

Controller General Description

Figure 2:
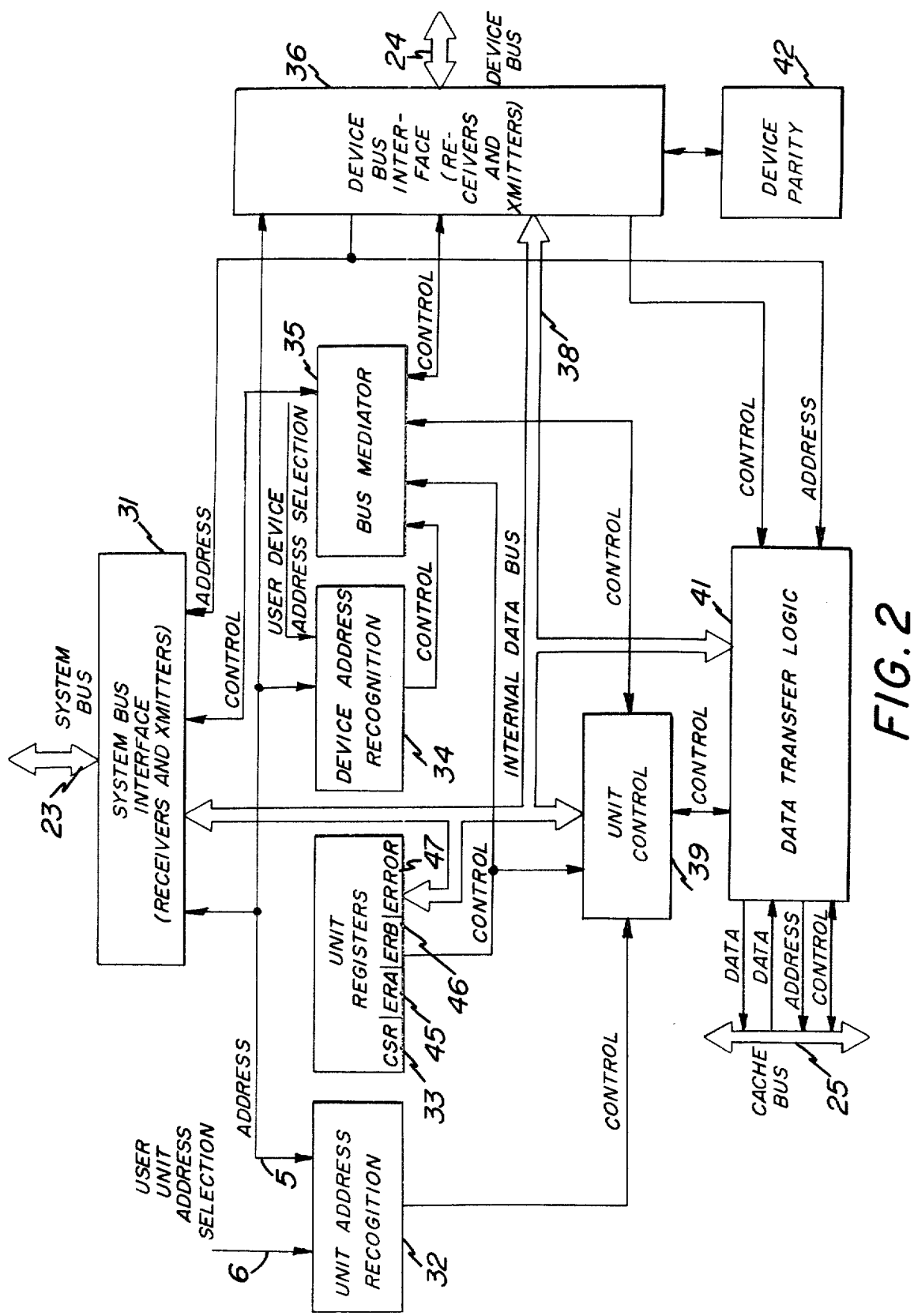
FIG. 2 illustrates in basic blok diagram form the controller of FIG. 1.

FIG. 2 shows the functional block diagram of high speed controller 18.

System bus interface 31 is composed of receivers and transmitters which provide buffering necessary to connect the high speed controller to system bus 23. The data lines on system bus 23 are connected to internal data bus (IDB) 38 by tri-state gates. Thus, data can flow either from IDB 38 to system bus 23, by way of interface 31, or data can flow from system bus 23 to IDB 38. The data may consist of information to be used either by the controller's unit registers 33, 45, 46 and 47, or by device 19, by way of device bus interface 36 and device bus 24. The address and control lines on system bus 23 are also buffered by system bus interface 31 for both the signals received from system bus 23 and those to be transmitted to system bus 23.

Device bus interface 36 is also composed of receivers and transmitters which provide the buffering necessary to connect controller 18 to device bus 24. As with system bus interface 31, the data lines on device bus 24 are connected to IDB 38 and are tri-state; data may flow either from device bus 24 to system bus 23 or to memory bus 25 both by way of IDB 38. The other lines, control and address on device bus 24 are buffered by device bus interface 36.

Device parity 42 generates odd parity for each byte of data transmitted to device 19 by way of device bus 24. On incoming data from the device, parity is verified and an error signal generated, if necessary. Device parity 42, at the option of the operator, may be enabled or disabled.

Unit address recognition 32 examines the address appearing on address line 5 which arrives from system bus 23 by way of system bus interface 31. The address of high speed controller 18 is stored by the user in unit address recognition 32 by appropriately selecting user unit address selection 6. When a match is found between the address appearing on system bus 23 and the address stored by user unit address selection 6, the related instruction on system bus 23 is sent to the high speed controller's unit registers 33, 45, 46 and 47, by way of IDB 38. The instruction may be from CPU 15 wishing to read data from or write data to controller 18.

The controller's unit registers contain four addressable registers: CSR 33, ERA 45, ERB 46, and ERROR 47. The exact bit configuration of each is described in the following Table and in FIG. 3.

TABLE 1

| HIGH SPEED CONTROLLER REGISTERS | | |
|---|---|---|
| A. CSR Register 33 | | |
| Bits | Name | Function |
| 0–1 | ERR SEL (Error Select) | Selects which error information is returned when the ERROR register 47 is read |
| 2 | 0 | Allows CSR to be incremented for reading ERROR register 47. |
| 5 | ENB (Enable) | A "1" enables high speed controller 18. This directs all transfers between device 19 and memory 17 through memory bus 25. A "0" disables the high speed controller 18 which forces the data transfers through system bus 23. (i.e. transparent mode). |
| 7 | BUSY | A "1" indicates that at least one byte of data stored in high speed controller 18 has not been transferred to memory 17. |
| 10 | MTO (Memory Time Out Error) | A "1" indicates that high speed controller 18 made a request to memory 17 and was not serviced within 40 μsec. |
| 11 | EXE (Extension Error) | A "1" indicates that device 19 attempted to use an address extension register which was not enabled. No transfer was accomplished and device 19 timed out. |
| 12 | MDE (Memory Data Error) | A "1" indicates that a data parity error has been detected when data was read from memory 17. No transfer was accomplished to device 19 and therefore it timed out. |
| 13 | NEM (Non-Existent Memory Error) | A "1" indicates that device 19 attempted to address a non-existent memory position. The main memory unit 16 timed out trying to access this address. Device 19 timed out during the read operation or on the following write operation. |
| 14 | APE (Address Parity Error) | A "1" indicates that an address parity error occurred between the memory 17 and main memory unit 16. No transfer was completed. Device 19 timed out during the read operation or on the following write operation. |
| 15 | ERR (Error Summary) | A "1" indicates that at least one of the preceding error conditions (bits 10–14) is present. |
| B. ERA Register 45 | | |
| Bits | Name | Function |
| 0–5 | AE0 (Address Extension 0) | These bits are used as bits 16–21 of high speed memory 17 address when device 19 address extension bits are 00. |
| 6 | EE0 (Extension Enable 0) | A "1" indicates that a valid number is in AE0. |
| 8–13 | AE1 (Address Extension 1) | These bits are used as bits 16–21 of the high speed memory address when device 19 address extension bits are 01. |
| 14 | EE1 (Extension Enable 1) | A "1" indicates that a valid number is in AE1 |
| C. ERB Register 46 | | |
| Bits | Name | Function |
| 0–5 | AE2 (Address Extension 2) | These bits are used as bits 16–21 of high speed memory 17 address when device 19 address extension bits are 10. |
| 6 | EE2 (Extension Enable 2) | A "1" indicates that a valid number is in AE2. |
| 8–13 | AE3 (Address Extension 3) | These bits are used as bits 16–21 of high speed memory 17 address when device 19 address extension bits are 11. |
| 14 | EE3 Extension Enable 3) | A "1" indicates that a valid number is in AE3 |
| D. ERROR Register** 47 | | |
| Error Select bits = 0 | | |
| Bits 0–5 | | These bits are bits 16–21 of the address last used to address memory 17. |

TABLE 1-continued
HIGH SPEED CONTROLLER REGISTERS

| | |
|---|---|
| Bits 6-7 | These bits are the C1 and CX bits used in the last memory 17 transfer as follows: |

| C1 | CX | Operation |
|---|---|---|
| 0 | 0 | Read |
| 1 | 0 | Write Single Word |
| 1 | 1 | Write Double Word |
| 0 | 1 | Not used |

| | |
|---|---|
| Bits 8-9 | These bits are the address extension bits of the last device address accepted by high speed controller 18. |
| Bits 10-13 | These bits indicate the results of each byte's last transfer with memory 17. If the last operation was a write, these are the parity bits. If the last operation was a read, a "1" in these bits indicates a parity error(s) was detected on that byte. |
| Error Select bits = 1 | |
| Bits 0-15 | These bits are the address bits last used to address memory 17. |
| Error Select bits = 2 | |
| Bits 0-15 | These bits are the EVEN data word which was last transferred to/from memory 17. |
| Error Select bits = 3 | |
| Bits 0-15 | These bits are the ODD data word which was last transferred to/from memory 17. |

**The data which is read from the ERROR REGISTER is determined by the ERROR SELECT bits of the CSR REGISTER.

The actual registers in Table 1 are composed partially of read or write storage registers and partially of read-only monitor points for diagnostics. CSR 33 is the command and status register which may be used by CPU 15 to enable controller 18 and select what error information is to be returned when ERROR register 47 is read. The CSR is also used to indicate the status of controller 18, i.e., to indicate whether the controller is busy or whether an error has occurred in the data exchange. The ERROR register is a read-only register which is used for diagnostic purposes to indicate various occurrences in controller 18. ERA 45 and ERB 46 are address extension registers which provide the necessary address mapping from device 19 to high speed memory unit 17. The address mapping is explained in more detail in the next section.

Device address recognition 34 acts as a "filter" between system bus 23 and device bus 24. This allows only appropriate data, appearing on system bus 23, to be transferred to device 19 by way of IDB 38. When device address recognition 34 recognizes that an address appearing on address 5 has arrived from system bus 23 and is that belonging to device 19, it will allow the data appearing on system bus 23 to be transferred to IDB 38, and then to device bus 24. Similarly, any system bus 23 data transfers to addresses outside those belonging to device 19 will not be placed onto IDB 38, nor device bus 24. This minimizes unnecessary traffic on device bus 24 thus allowing the bus more time for data transfers.

Bus mediator 35 maintains the proper relationship between system bus 23 and device bus 24. It performs a specialized bus repeater function in that it controls signal flow in both directions with respect to the command being executed. The mediator controls CPU 15 and device 19 read and write cycles as well as the interrupt sequence. An interrupt is a request from device 19 to CPU 15 that it desires the CPU to interrupt its current task and provide service to the device 19. This is discussed in more detail later. Mediator 35 also determines which receivers and transmitters in system bus interface 31 and device bus interface 36 are activated; what data, appearing on either system bus 23 or device bus 24, is placed on IDB 38; and what timing signals are produced by unit control 39. In doing these operations, control signals are not simply delayed by analog circuits, instead an interactive logic sequence generates the information based upon the events occurring on system bus 23 and device bus 24. Acting as an arbitrator, bus mediator 35 provides priority encoding and handshaking for device 19 during non-processor requests (NPR) and bus requests (BR). NPR and BR are requests by device 19, which are placed on device bus 24, to gain control of system bus 23; NPR as the name implies, does not require CPU 15 service, whereas BR does. The priority encoding and handshaking are discussed in detail later.

Unit control 39 handles all controls of read and write cycles between device bus 24 and system bus 23, between device bus 24 and memory bus 25, and between controller 18 unit's registers and system bus 23. Finally, data transfer logic 41, shown in FIG. 2, aids unit control 39 in providing the interface necessary to transfer data from device bus 24 to IDB 38, and then to memory bus 25. Data logic 41 also provides the interface to transfer data from memory bus 25 to IDB 38, and then on to device bus 24. These read and write cycles are discussed in detail later.

High speed controller 18 has four operational modes. The first mode is the controller 18 unit read or write. During this mode, CPU 15 either examines or deposits data into unit registers 33, 45, 46 and 47. Memory bus 23 and device bus 24 do not play an active role in this operation. The second mode is the device 19 read or write. During the second mode, CPU 15 either examines or deposits data into device 19. The high speed controller acts like a bus repeater between system bus 23 and device bus 24 in this case, although it allows the operation only if the address specified by CPU 15 is within the specified window of device 19. The control signals are retimed as they are relayed. The third operational mode is the memory read or write in which device 19 directly reads from or writes data to the memory using bus 25. The fourth mode is the processor read or write, also known as the transparent mode. In this mode, device 19 does a direct memory access while high speed controller 18 is disabled. The signals from device 19 are passed along system bus 23 with controller 18 actings as a repeater. The processor read cycle transfers data from memory 17 to system bus 23, then onto IDB 38, and finally onto device bus 24; a processor write cycle is the reverse. Memory bus 25 does not play an active role in this operation.

Data Transfer Logic

Figure 4A:
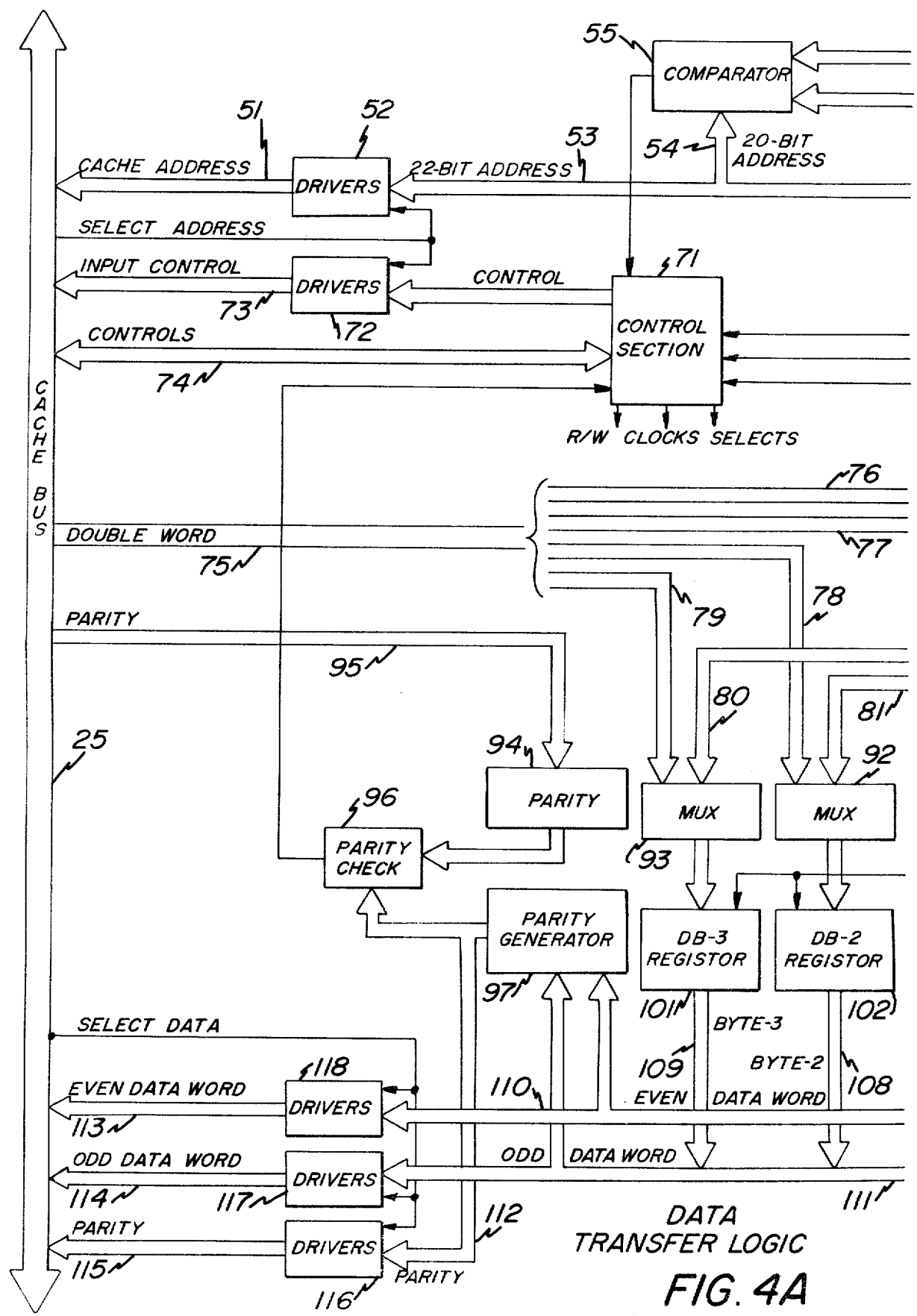

FIGS. 4A-B show in more detail the data transfer circuits forming data transfer logic 41. The data transfer circuits provide the interface between memory bus 25 and device bus 24 during data transfers. A write transfer occurs when device 19 is depositing data into high speed memory 17; a read transfer occurs when data is transferred from memory 17 to device 19.

During a write transfer, device 19 places, by way of device bus interface 36, the data on IDB 38, the address on address bus 62, and the control in control bus 70. The data consists of a single word composed of 16 bits. The address consists of 18 bits and the control consists of 2 bits. The data, address and control are then stored in DA register 85, AA register 61 and C register 65, respectively. The upper two bits of the address, by way of address extension bus 60, select one of the four extension registers located in ERA 45 and ERB 46. The extension registers produce the upper 6-bits of the final address to be sent to memory 17. This is necessary because memory 17 uses a 22-bit address, whereas device 19 outputs an 18-bit address. Hence, the device address must be mapped into the appropriate memory address. The extended 6-bits and the original 16-bits, appearing on bus 58 and 56, respectively, are then transferred to AB register 66. Controller 18 has now mapped an 18-bit address into a 22-bit address.

Similarly, during the write transfer, the 16-bits of data that have been stored in DA register 85 are passed by way of the four multiplexers, MUX 90, 91, 92 and 93, to the appropriate DB register. The 16-bit single word is split by DA register 85 into two bytes, each byte comprising 8-bits. If an even data word is stored in DA register 85, DB-0 register 104 and DB-1 register 103 will each receive one byte; if an odd data word is stored in DA register 85, DB-2 register 102 and DB-3 register 101 will each receive one byte. Each byte transferred to a DB register asserts its validity bit in byte validity check 122. If all 4 validity bits are set, a memory write cycle is performed by control section 71 to write the 32-bits of data found on bus 110 and bus 111 plus 4 parity bits found on bus 112 to memory 17. This is done by enabling drivers 116, 117 and 118, and transferring the data and parity onto memory bus 25. If less than four validity bits are set, no action is taken at this time. The write to memory is performed, however, if no further write control commands are received by C register 65 within the inter-transfer time out period, or a Bus Request or Read Command is received from device bus interface 36. Control section 71 and its associated write sequence are later described in more detail.

Furthermore, when another write command is received on control bus 70, the address stored in AA register 61, together with its extension stored in extension registers 45 or 46 are compared to the address already stored in AB register 66. This comparison is done by comparator 55. Only the upper 20-bits out of a total 22-bit address are compared. If the upper 20 bit sets are equal, it implies that the 16-bit data word stored in DA register 85 is part of the same 32-bit word to be written into memory 17. Consequently, the data in DA register 85 is transferred to the appropriate DB registers. On the other hand, if the upper 20 bit sets are not equal, it implies that the 16-bit data word stored in DA register 85 is not part of the same 32-bit word to be written into memory 17. Thus, data already stored in the DB registers must be first transferred as described earlier, to memory bus 25 before any new data is written into the DB registers. Therefore, a memory write cycle is initiated by control section 71. Upon completion the data in DA register 85 and the address in AA register 61 are transferred to the appropriate DB registers and AB register 66, respectively. The above cycle is then repeated for the next address and data transmitted from device 19 to be written into memory 17.

A read cycle is similar to a write cycle except that data flows from memory 17 to device 19. When a read command is received by control bus 70, the address appearing on address bus 62 is placed in AA register 61 and the control bits on control bus 70 are placed in C register 65. If the upper 20-bits of the extended address, appearing on bus 58 and bus 57, are the same as the upper 20-bits of the address stored in AB register 66, the appropriate DB register pair is gated to IDB 38 by way of multiplexer 105. Device 19 is signalled and data is gated out to device bus 24 by way of device bus interface 36. If the upper 20-bits of the extended address are not the same as the upper 20-bits of the address stored in AB register 66, AA register 61 data is transferred to AB register 66 and a memory read cycle is initiated by control section 71 to load the DB registers. Once this is completed, the correct data is gated by multiplexer 105 to IDB 38 to finish the read operation.

As can be seen from FIGS. 4A-B and the above description, the read operation is done in two steps. This is necessary because memory 17 loads a double word consisting of 32-bits onto bus 75. These 32 bits are distributed among the four DB registers 101, 102, 103 and 104 with each register getting 8 bits, or a byte. Since device bus 24 can only handle a 16-bit word, multiplexer 105 transfers first the even data word and then the odd data word appearing on bus 110 and bus 111, respectively.

As shown in FIGS. 4A-B, during a write cycle, parity generator 97 produces the four parity bits that appear on parity bus 112. These parity bits, along with the 32-bits of data appearing on busses 110 and 111 are transferred to memory bus 25. On a read cycle, however, 4 parity bits originating from memory bus 25 appear on bus 95, are stored in parity register 94 and are examined by parity checker 96.

Unit Slave Control

As already described, one of the operational modes of high speed controller 18 is the unit read or write mode. During a unit read or write, CPU 15 either examines or deposits data into unit registers 33, 45, 46 and 47. Controller device 19 and device bus 24 do not play an active role in this operation. In this mode, the CPU is master and the high speed controller is slave. The handshaking required between the CPU and the high speed controller is accomplished by unit slave control shown in FIG. 5. The timing relationship of the handshaking operation is shown in FIG. 6.

As shown in FIG. 5, unit address 201 and system input (SIN) master sync 202 is received by gate 200. Unit address 201 is activated by unit address recognition 32, once it recognizes that CPU 15 wishes to read data from or write data to unit registers 33, 45, 46 and 47. Furthermore, SIN master sync 202 is received by way of system bus interface 31 establishing that CPU is the master in this operation. Clock 203 provides the basic clock for proper timing. These three signals start a timing delay in timing delay control 204 to produce delay clock 205 and strobe 211. Strobe 211, in-turn, activates decoder 212. The function of decoder 212 is to determine whether a write or read operation is desired by CPU15. Depending on SIN C1 bit 213, which arrives by way of system bus interface 21, decoder 212 ascertains the proper operation. If a write operation is desired by CPU 15, the decoder outputs unit write 214 to gate 216; on the other hand, if a read operation is desired, unit read 215 is outputted to read multiplexer 222.

During a write operation gate 216 produces write pulse 218, which subsequently activates write multiplexer 219. Depending on SIN A1 209 and SIN A2 210, both of which arrive by way of system bus interface 31, either CSR write command 220 or AE write command 221 is produced. The CSR write command outputs write pulses to CSR register 33, so that CPU 15 may write data into the CSR register; similarly, AE write command 221 outputs write pulses to the address extension registers ERA 45 and ERB 46, so that CPU 15 may write data into the address extension registers. Once the appropriate unit register is set to receive data from CPU 15, SIN data receivers enable 226 is activated by way of buffer 217. This allows the receivers in system bus interface 31 to accept data from system bus 23 and place the same data on IDB 38. Data placed on the IDB is then accepted by the appropriate CSR 33, ERA 45 or ERB 46 register. Subsequent to storage of data in a unit register, timing delay control 204 activates unit slave sync 206 to eventually produce SO (system out) slave sync 208. The SO slave sync is transmitted by system bus interface 31 onto system bus 23, indicating to CPU 15 that the write operation has been completed. As noted in FIG. 6, the SO slave sync marks the end of a write operation.

A read operation is similar to a write operation, except that data flows from unit registers 33, 45, 46 or 47 to CPU 15. During a read operation, decoder 212 activates unit read 215, which subsequently activates read multiplexer 222. Depending on the ERR SEL bits stored in CSR register 33, the appropriate ERROR register 47 is enabled by read error 223. Similarly, if CPU 15 requests to read CSR register 33, ERA register 45 or ERB register 46, read multiplexer enables the appropriate register; read CSR 224 enables CSR register 33, and read AE 225 enables either ERA register 45 or ERB register 46 dependent on SIN A1 209. Once a register is enabled, it places its data onto IDB 38. Next, SO data drivers enable 231, by way of buffer 230, activates the data drivers in system bus 21. This allows data on IDB 38 to be transmitted to system bus 23. Again, as in the write operation described earlier, SO slave sync 208 marks the end of a read operation.

Device Slave Control

The second operational mode of high speed controller 18 is the peripheral device read or write. During this mode, CPU 15 either examines or deposits data into controller device 19. High speed controller 18 acts like a bus repeater in this case, although it allows the operation only if the address placed on system bus 23 is within the specified window recognized by device address recognition 34. In this mode, CPU 15 is master and controller device 19 is slave. The handshaking required between the CPU and the device is accomplished by device slave control shown in FIG. 7. The timing relationship of the handshaking operation is shown in FIG. 8.

Referring to FIG. 7 and FIG. 8, SIN (system in) CL bit 213 is sent from CPU 15 to decoder 251 by way of system bus interface 31. SIN C1 bit 213 indicates to decoder 251 that a read or write operation is desired by CPU 15. No further action will occur, unless device address 250 is received from device address recognition 34 to indicate that CPU 15, in fact, wishes to read from or write data to controller device 19. With strobe 211 providing the proper cue, decoder 251 establishes device write 252, indicating that a write operation is to occur; or it establishes device read 253, indicating that a read operation is desired.

The generation of either device write 252 or device read 253 produces DO address driver enable 264 via gate 257. This causes the address received from system bus 23 by address receivers in system bus interface 31 to be transmitted to device bus 24 by address transmitters in device bus interface 36.

During a write operation, device write 252 causes SIN data receivers enable 226 to be activated by way of buffer 217. The activation of this signal enables the data receivers in system bus interface 31. This allows the data receivers to accept data from system bus 23 and place the same data on IDB 38. Simultaneously, DO (device out) data drivers enable 261 is also activated by device write 252. DO data drivers enable activates the data transmitters in device bus interface 36. Consequently, the data placed on IDB 38 is transmitted to device bus 24. This completes the travel path for the data, which started at system bus 23 and finished at device bus 24.

In order to provide the appropriate handshaking during a write operation, timing delay control 255 ensures that the slave sync and master sync are transmitted at the appropriate time. Thus, at the start of the write operation, CPU 15 transmits the master sync to system bus 23. System bus interface 31 relays the same signal, now called SIN master sync 202, to gate 258. At the proper sequence, timing delay control 255 activates gate 358 so that DO (device out) master sync 265 can be transmitted, by way of device bus interface 26, to device bus 24. Once the data, address and control have been removed by controller device 19 from device bus 24, DIN (device in) slave sync 254 is returned indicating that the write operation has been completed. Subsequently, timing delay control 255 enables buffer 207 sending SO slave sync 208 to system bus 23 by way of system bus interface 31. This indicates to CPU 15 that the device 19 has completed the write operation.

In the read cycle, the timing sequence cannot work the same way since the data placed on system bus 23 might be removed before the CPU has completed reading the data. A latching operation using system bus 23 circumvents this problem. After the address and command decoding, device 19 responds with data and DIN slave sync 254 by way of device bus interface 36. This data is placed on IDB 38 by DIN data receivers enable 268 and then relayed to system bus 23 by way of system bus interface 31. The data is placed on system bus 23 by SO data drivers enable 231 which enables the transmitters in system bus interface 31. Thus far, the sequence of events in a read operation is similar to a write operation, except that data flows in the opposite direction. At this time, the data that has been placed on system bus 23 must be kept there until CPU 15 has read the data. This is accomplished by device read latch 256. After a delay, SIN data receivers enable 226 activates the receivers in system bus interface 31. This places the same data as on system bus 23 onto IDB 38. Then DIN data receivers enable 268 is turned off. This leaves the receivers in system bus interface 31 connected to IDB 38 which is the input to the transmitters in system bus interface 31. Since the transmitters are still activated by SO data drivers enable 231, the data is maintained on system bus 23. DO master sync 265 is then removed, by timing delay control 255, as SO slave sync 208 is generated. Once SO slave sync 208 disappears, SIN data receivers enable 226 is reset and the latch loses the data. This completes the read operation.

Processor Slave Control

As already described, the third operational mode of high speed controller 18 is the transparent mode. In this mode, device 19 accesses memory to write to or read from memory while high speed controller 18 is disabled. The signals are passed along system bus 23 with controller 18 acting as a repeater. In this operation, controller 18 is master and CPU 15 is slave. The write to memory sequence is known as a processor write cycle, and the read from memory as a processor read cycle. The handshaking required between CPU 15 and controller 18 during read or write cycles is satisfied by processor slave control shown in FIG. 9. The timing relationship of the handshaking operation is shown in FIG. 10. The timing is essentially the same as that described earlier for device slave control, except that the signals are interchanged. Moreover, device 19, as master, has gained control of system bus 23. The manner by which device 19 gains control over the bus is described fully later.

As shown in FIG. 9 and FIG. 10, DIN master sync 278 starts the sequence for both read and write operations. DIN master sync is asserted by device 19 which has now been granted use of system bus 23 by CPU 15. The initialization of DIN master sync activates latch output 283, by way of latch flip-flop 284. So long as high speed controller 18 is disabled and device 19 is master and still busy, gate 282 is enabled. That controller 18 is disabled is indicated by unit enable 273 being off, that device 19 is master is indicated by device slave 274 being off, and finally, that device 19 is busy is indicated by DIN busy 275. Subsequent to gate enabled 280 being set, decoder 279 interprets DIN C1 bit 270 and determines whether device 19 desires to read from or write data to memory. If a write operation is desired, processor write 286 is enabled; if a read operation is desired, processor read 285 is enabled.

During a write cycle, timing delay control 288 ensures proper timing of events. SO address drivers enable 293 enables the address transmitters in system bus interface 31. This places the address sought by device 19 onto system bus 23. Then SO master sync 292 is generated out to system bus 23 by way of system bus interface 31. This indicates to CPU 15 that device 19 is master of the system bus. Finally, transfer of data from device bus 24 to system bus 23 is accomplished by setting DIN data receivers enable 268 and SO data drivers enable 231. The setting of DIN data receivers enable 268 permits transfer of data from device bus 24 to IDB 38 by enabling the data receivers in device bus interface 36. The setting of SO data drivers enable 231 permits transfer of the same data from IDB 38 to system bus 23, by enabling the data transmitters in system bus interface 31. This completes the write operation, and is indicated by the return of SIN slave sync 277, by way of system bus interface 31. Subsequently, DO slave sync 290, retimed by timing delay control 288, is propagated to device 19 by way of device bus interface 36.

During a read cycle, timing delay control 288 again ensures proper timing. All sequences are similar to a device slave read operation, already described earlier. The read cycle transfers data from system bus 23 to device bus 24. This is accomplished by activating SIN data receivers enable 226 and DO data drivers enable 261. The setting of SIN data receivers enable 226 permits transfer of data from system bus 23 to IDB 38, by enabling the data receivers in system bus interface 31. The setting of DO data drivers enable 261 permits transfer of same data from IDB 38 to device bus 24, by enabling the data transmitters in device bus interface 36. To insure that data is not removed from device bus 24 before device 19 has completed its read operation, processor read latch 291 is enabled. DO slave sync 290 is not sent to device 19 until the end of the latching operation. Once DO slave sync 290 is received by device 19, the end of a read operation is indicated.

Memory Cycle Control

The fourth operation mode of high speed controller 18 is the memory read or write mode. In this mode, device 19 writes data to or reads data from memory 17 by using cache bus 25 and memory control 17. The write cycle transfers data from the device to memory, whereas the read cycle transfers data from memory to the device. During the transfer cycle, device 19 acts as master as it does in the transparent mode. However, data, address and control is routed not by way of system bus 23 but by way of cache bus 25. The timing and control of the data transfers are handled by the memory cycle shown in FIGS. 11A-B. The timing relationships are shown in FIG. 12.

Figure 11A:
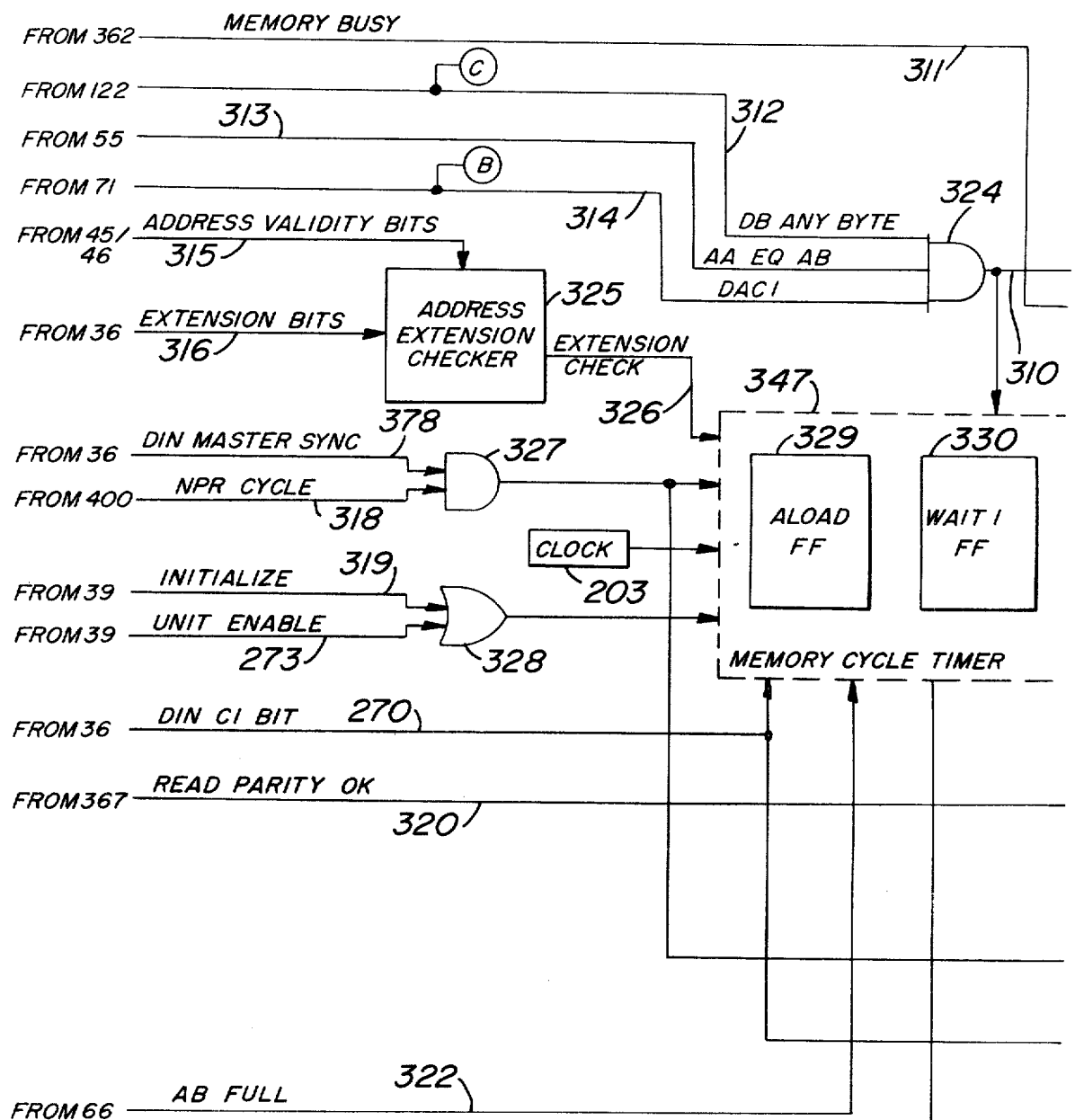
FIGS. 11A-B illustrate in more detail and in block form memory cycle control of FIGS. 2 & 4A-B.
Figure 11B:
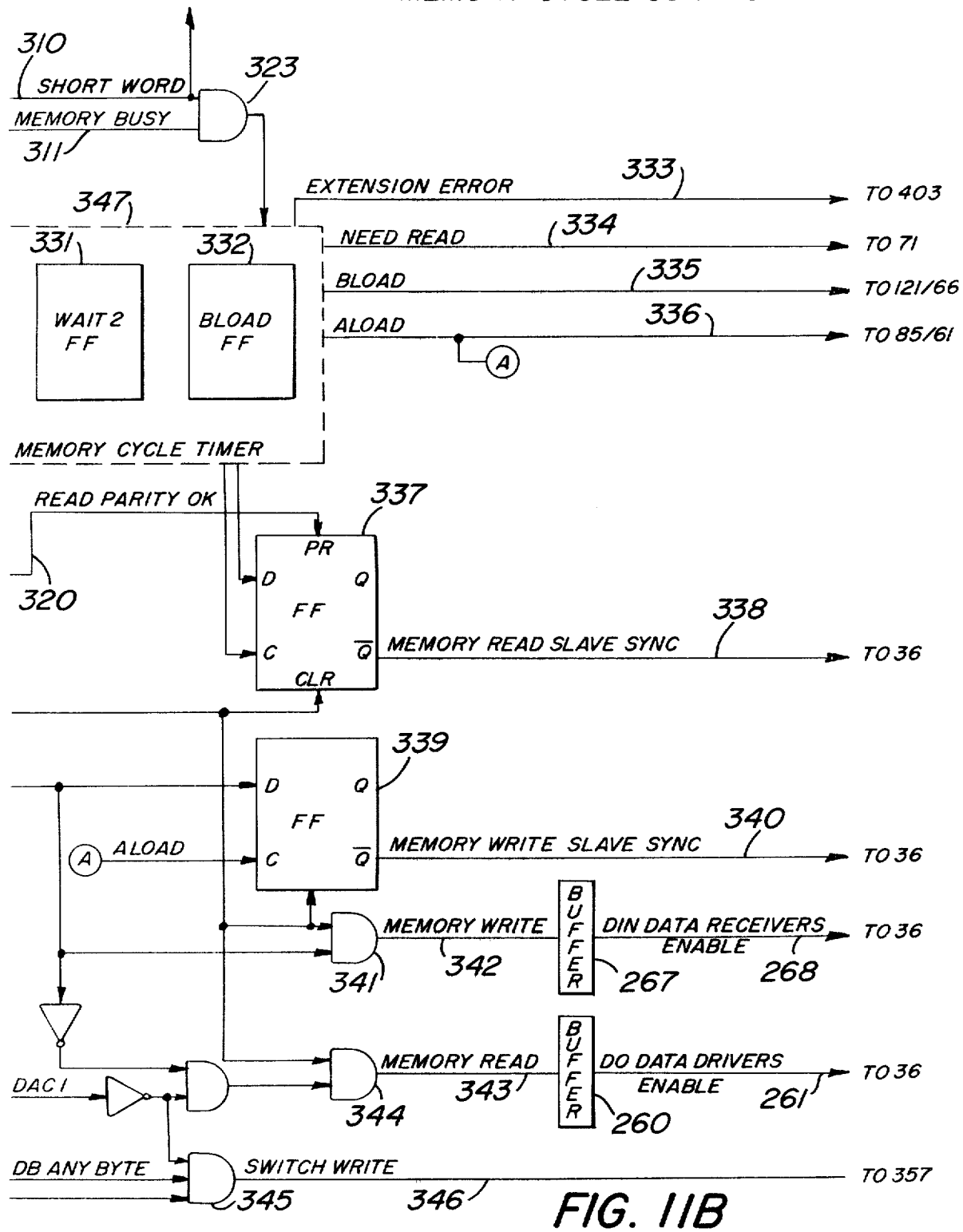

Device 19 first gains control of device bus 24 by way of the NPR cycle, described later in detail. During its control, NPR cycle 318 is enabled. Moreover, the beginning of a write or read cycle is indicated by DIN master sync 278. The activation of both signals, in conjunction with unit enable 273, start the memory cycle timer 347. As shown in FIGS. 11A-B, the memory cycle timer is comprised of ALOAD flip-flop (FF) 329, BLOAD FF 332, WAIT 1 FF 330 and WAIT 2 FF 331. The ALOAD FF controls the loading of AA register 61 and DA register 85. As described previously, the AA register contains the 18-bit address transmitted by device 19 which addresses a location in memory 17; the DA register contains the 16 bits of data transmitted by device 19 for storage in memory 17. Finally, the BLOAD FF controls the loading of AB register 66 and DB registers 101, 102, 103 and 104. As also described, the AB register contains the extended 22-bit address required for memory 17, and the DB registers each contain 8-bits of data for read or write operations.

ALOAD 336 is not generated if an extension error occurs, indicated by extension check 326. By comparing address validity bits 315 with extension bits 316, address extension checker 325 determines whether the extension is correct. If correct, ALOAD 336 is generated to load AA register 61 and DA register 85; if incorrect, extension error 333 is produced which halts the response to device 19, causing a timeout in it. Once ALOAD FF 329 is set, WAIT 1 FF 330 and WAIT 2 331 produce a wait cycle to allow address comparator 55 to settle. After this, BLOAD FF 332 will be set, unless a transfer from DB registers (101-104) to memory 17 is in progress, indicated by memory busy 311, or short word 310 occurs. This indicates that at least one byte of data needs to be written to memory 17 before a new word with a different address is accepted. If this occurs, BLOAD FF 332 is not set until after that operation is completed. All reads set BLOAD FF 332 immediately after the delay timed by WAIT 2 FF 331.

If a new address is being used, or the first address after an initialize 319 is activated, need read 334 is reset by BLOAD FF 332. This initiates a memory cycle which eventually produces read parity OK 320 to activate memory read slave sync 338. If the data is already available in DB registers 101, 102, 103 and 104 from a previous double word read operation, BLOAD FF 332 sets FF 337 and data is transferred immediately.

During write operations ALOAD 336 produces, by way of FF 339, memory write slave sync 340. This indicates to device 19 that the write cycle is completed. A similar signal, memory read slave sync 338 is produced to indicate that a read operation has been completed. Furthermore, during a write operation DIN data receivers enable 268 activates the receivers in device bus interface 36. This transfers data from device bus 24 to IDB 28 and then to DA register 85. During a read operation, DO data drivers enable 261 activates the transmitters in device bus interface 36, so that data placed on IDB 38 from DB registers 101-104 can be transferred to device bus 24.

The transfer of data between device 19 and memory 17 is accomplished in two parts. The first part, accomplished by memory cycle control shown in FIGS. 11A-B and discussed above, controls the transfer of data between device 19 and high speed controller 18. The second part, accomplished by memory interface control 71, controls the transfer of data between controller 18 and memory 17. Memory interface control 71 is depicted in detail in FIGS. 13A-B and discussed below.

As shown in FIGS. 13A-B, the transfer of data is initiated by priming request FF 362. This is caused by any one of six conditions. The first condition is the presence of short word 310. This signal, which arrives from gate 324 of the memory cycle control, indicates that at least one byte of data is valid during a write operation and that the address in AA register 61 does not match that in AB register 66. This is most commonly the result of a write operation beginning at an odd word address, such as NNNNN2 or NNNNN6. The second condition is the presence of need read 334. This signal, arriving from memory cycle timer 347, indicates that device 19 is requesting data from an address placed in AA register 61 that is not stored in AB register 66. Since the data already placed in DB registers 101, 102, 103 and 104 is from address in AB register 66, a read cycle needs to be performed. The third condition is the presence of DB all bytes 355. This signal which arrives from byte validity check 122, indicates that all four bytes of DB registers 101, 102, 103 and 104 contain data to be written to memory. A full double word (4 bytes) is to be written to memory 17. The fourth condition is the presence of switch write 346, which is also activated by memory cycle timer 347. This indicates that device 19 has requested data from memory 17 while at least one byte of data in the DB registers remains to be written to memory. The condition only occurs if device 19 changes from a write to read operation without any interrupt between them. The fifth condition is the presence of DIN BR 356. This signal is activated when device 19 generates an interrupt to CPU 15. If at least one byte of data needs to be transferred to memory 17, the transfer is allowed to proceed. The last condition is the occurrence of a lapse of time caused by inter-transfer timeout multivibrator (MV) 359. If no DIN master sync 278 is received from device 19 during the allocated time period and data still remains in DB registers 101, 102, 103 and 104, the same data is written to memory 17.

Figure 14:
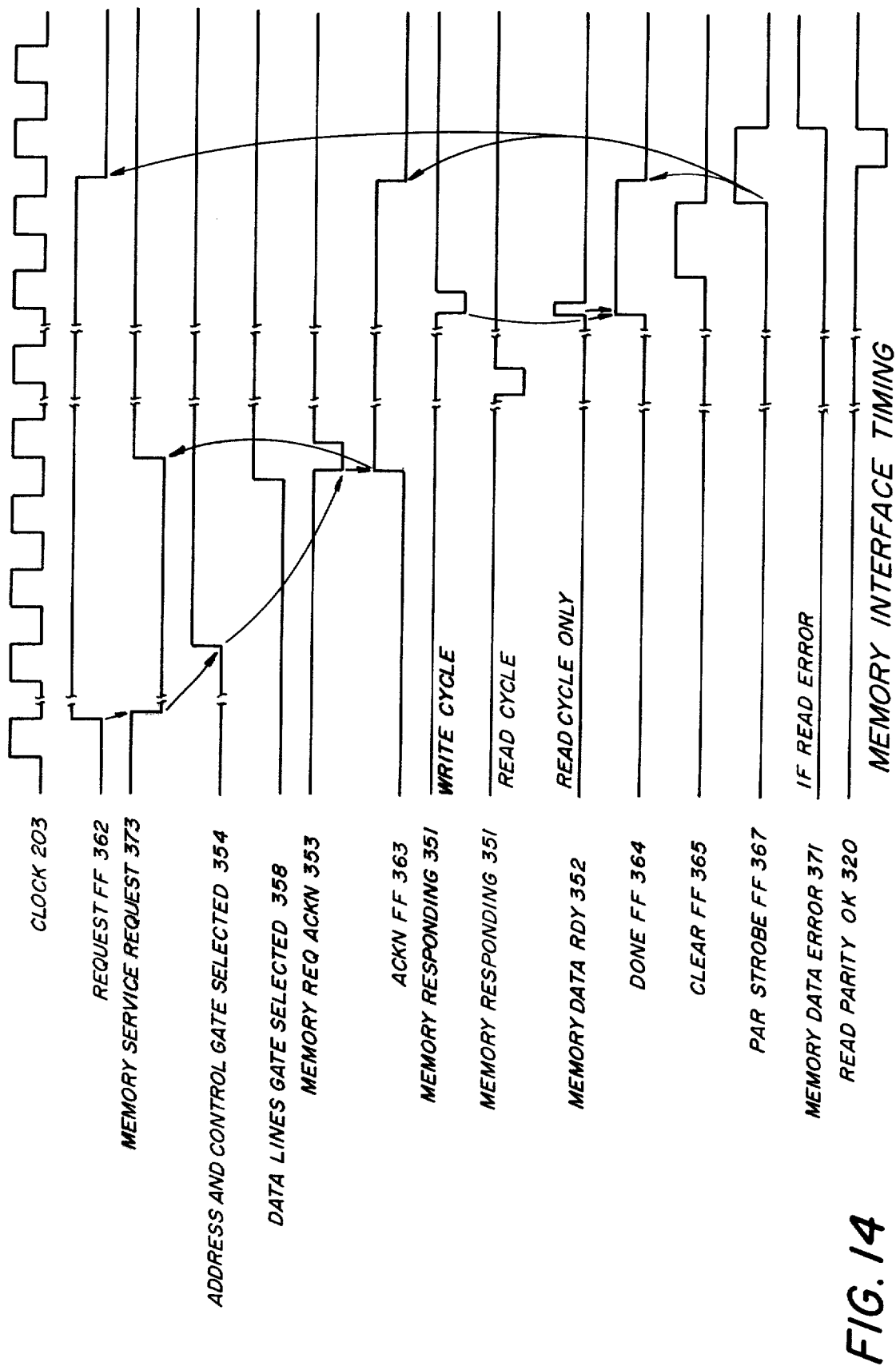
FIG. 14 illustrates waveforms helpful in understanding the operation of FIG. 13.

Once begun by any one of these conditions, memory interface control 361 sequences as shown in FIG. 14. The times shown are typical. The delay between the start of memory service request 373 to memory control 17 and the return of address and control gate selected 354 from it is dependent on bus 25 traffic and the internal priority scheme set up in memory control 17. Once this is received, the next signals shown in FIG. 14 follow a fixed pattern synchronous to a clock within memory control 17. A write cycle is terminated upon receipt of memory responding 351. The read cycle ignores this and waits until memory data ready 352 is received from memory control 17 to set done FF 364, which begins the clearing operation. Clear FF 365 then activates parity strobe FF 367. The parity strobe FF generates read parity OK 320, if no error is detected in the data by parity checker 96. However, if an error is detected, MDE storage 368 generates memory data error 371.

Finally, memory timeout MV 360 measures the duration of time that request FF 362 is active. If the request for using memory 17 is not satisfied within the proper time, memory timeout error 375 is generated, indicating that memory 17 is having a problem. Consequently, high speed controller 18 is reset.

NPR Cycle Control

Figure 15:
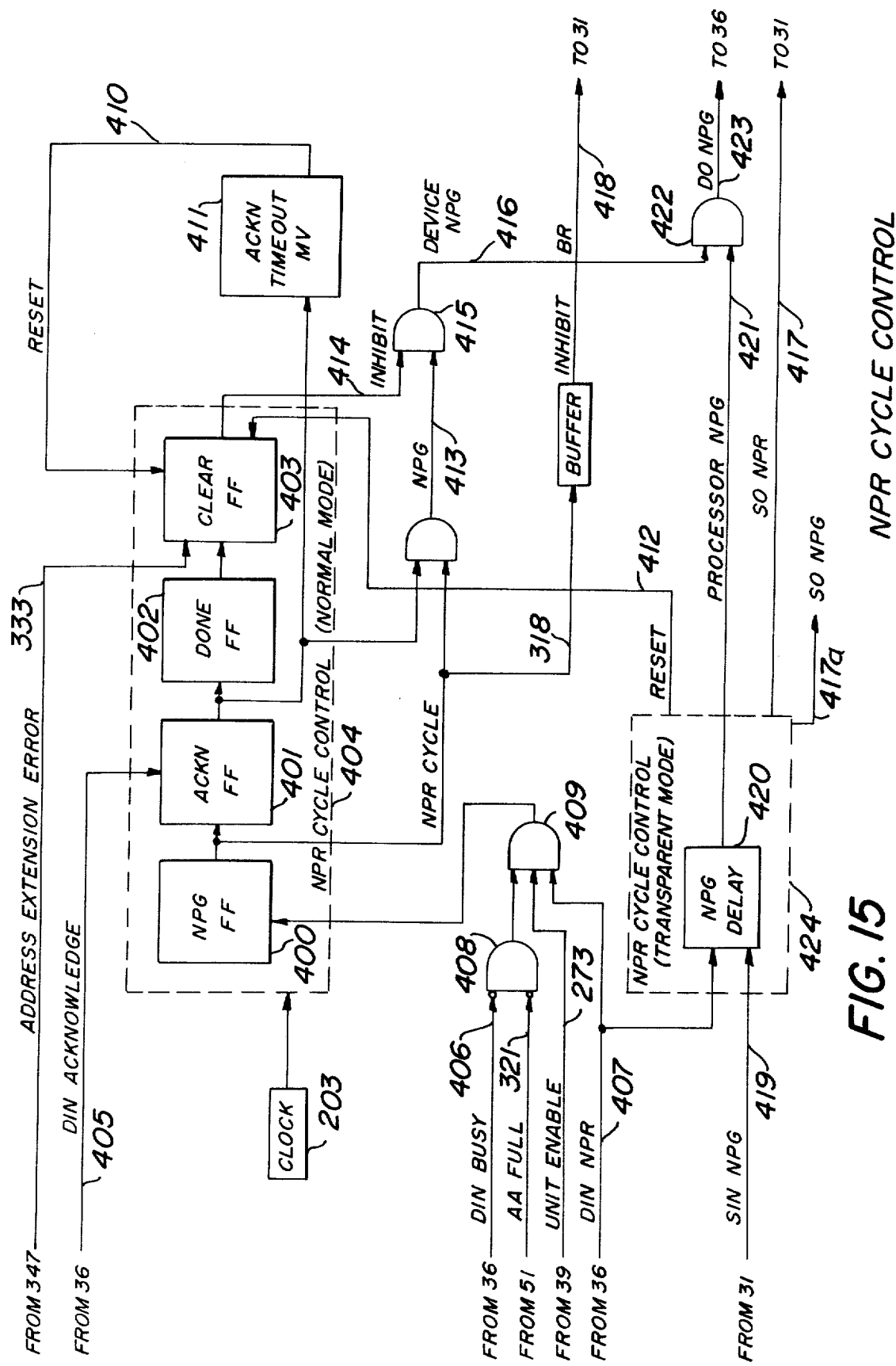
FIG. 15 illustrates in more detail and in block form NPR cycle control of FIGS. 2 & 4A-B.

When device 19 desires to transfer information to or from memory 17, it must generate a non processor request (NPR) to CPU 15. If granted its request, CPU 15 transmits a non processor grant (NPG) back to device 19. During NPR transfers, it is not necessary for CPU 15 to transfer the information between device 19 and memory 17. With the aid of controller 18, device 19 can read from or write to memory 17 without CPU 15 intervention. The processor state is not affected by this type of transfer. Control of NPR transfers is provided by the NPR cycle control shown in FIG. 15.

During the normal mode, i.e. when controller 18 is enabled, the NPR cycle control is provided by control 404, as shown. NPR FF 400 is set if a request is present, as indicated by DIN NPR 407 which arrives by way of device bus interface 36; AA register 61 is empty, as indicated by AA full 321 being off; and a cycle is not in process, as indicated by DIN busy 406. The setting of NPG FF 400 produces NPR cycle 318, which subsequently activates DO NPG 423. The DP NPG is then transmitted to device 19 by way of device bus interface 36. After device 19 receives the NPG, it returns DIN acknowledge 405 which sets ACKN FF 401.

When device 19 completes its operation and thus becomes not busy, done FF 402 is set. After the done FF is set, clear FF 403 is activated so that all the circuits can be reset. The clear function is also initiated by an address extension error indicated by address extension error 333. Moreover, if an acknowledge is not received from device 19 within a certain period of time, ACKN timeout MV 411 generates reset 410 to clear all the circuits.

Thus far, the NPR cycle during a normal mode of controller 18 has been described. A different NPR cycle exists during a transparent mode, i.e., when controller 18 is disabled. In the transparent mode, DIN NPR 407 is initiated by device 19 indicating that it wishes to use system bus 23. Since unit enable 273 is off, NPR cycle control 404 is disabled. DIN NPR 407 is routed to NPR cycle control 424, which activates SO NPR 417. This latter signal is then transmitted to CPU 15 by way of system bus interface 31, indicating that device 19 has requested use of system bus 23. When CPU 15 determines the control of the bus is to be relinquished, CPU generates SIN NPG 419 by way of system bus interface 31. Arrival of SIN NPG activates delay 420, which eventually produces processor NPG 421. Finally, gate 422 produces DO NPG 423 which is relayed to device 19 by way of device bus interface 36. When the NPG disappears, all circuits are reset to their initial states.

Since SIN NPG is produced by CPU 15 in response to any device requesting use of system bus 23, the transparent mode control 424 must decide to either produce processor NPG if device 19 has a request pending (DIN NPR active) or pass the signal along the system bus 23 as SO NPG 417 a if it is not to be used by device 19. NPG delay 420 allows time for this decision.

BR Priority Control

When device 19 initiates a bus request (BR), the handling of the request by CPU 15 depends on the location of that device in the priority structure of the entire processing system. Bus requests can be made on any one of five request priority levels. An NPR has the highest priority level and has already been discussed. Bus requests are next in priority. There are, however, four levels of priority within a BR. When CPU 15 is set to a specific level of priority, all BR's on that level and below are ignored. When more than one device is connected to system bus 23, the device within the higher priority is granted the bus by CPU 15. If granted the system bus, CPU 15 transmits a bus grant (BG) to the device.

FIG. 16 shows the BR priority control. By user priority programming, device priority selection 425 and system priority selection 433 control device 19 and controller 18 priority respectively. Under normal conditions, the device and controller priorities are set to the same levels. As shown, a bus request transmitted by device 19 is received as DIN BR 356, by way of device bus interface 36. If the bus request passes the priority level chosen by device priority selection 425, priority inhibit BR 426 is disabled. BR 429 is then allowed to pass on to bus grant arbitration logic 435, if all operations are completed as indicated by DB any byte 312 being off. System priority selection 433 enables SO BR 441 which is transmitted to CPU 15 by way of system bus interface 31. Depending on the priority level set by system priority selection 433, CPU 15 transmits back SIN BG 440, granting control of the system bus to device 19. Subsequently, bus BG 434 enables grant delay 436, which delays the BG and eventually outputs DO BG 439 to device 19. This completes the cycle between a bus request and a bus grant.

Interrupt Control

When device 19 gains control of system bus 23 with BR request, it can take full advantage of the processing capabilities of CPU 15. This is done by device 19 requesting an interrupt. The CPU is then available for manipulation by the device service routine. After the device request has been satisfied, CPU 15 returns to its former task. The interrupt control is shown in FIG. 17. Its associated timing sequence is shown in FIG. 18.

As shown, after the normal bus request/bus grant interchange, described earlier, device 19 asserts DIN SACK 451. This signal is then relayed to CPU 15 as SO SACK 459, and is also stored in FF 456. The bus grant signal, BG 439, makes device 19 appear busy and inhibits further action at that time. Once system bus 23 becomes idle and clears the busy status of device 19, DIN interrupt 452 is asserted by the same device. Device 19 then again appears busy. Once device interrupt 462 is generated, and SIN slave sync 277 disappears, SO interrupt 461 is activated. SO interrupt 461 is transmitted to CPU 15 by way of system bus interface 31. Finally, SIN slave sync 277 by becoming active, generates a device slave sync which removes the interrupt signals. This in turn clears the other lines. SACK reset 450 inhibits the interrupt control during NPR and NPG interchanges.

TABLE OF COMPONENTS

In controller 18, the following components have been used for the operation and function herein described.

| REFERENCE CHARACTER | COMPONENT | TYPE # |
|---|---|---|
| 33, 45, 46, 204 & 255 | Register - Control | 74174 |
| 90–94, 101–104 | Register | 74298 |
| 200 | Gate | 7432 |
| 212, 219, 251, 279 | Decoder - Multiplexer | 74S139 |
| 222 | Decoder - Multiplexer | 74S139(2X) |
| 65, 248, 337, 339, 357, 403, 454–457 | Flip-flop - Latch | 7474 |
| 288 | Register - Control | 74174(2X) |
| 325 | Checker | 74153 |
| 329,330,331 | Memory Cycle Timer | 74107(3X) |
| 332 | Memory Cycle Timer | 74S112 |
| 359, 360, 411 | Multivibrator | 74123 |
| 362, 368, 400–402 | Flip-Flop | 74107 |
| 363–367, 435 | Flip-Flop | 74S112 |
| 420 | Delay | 74107(2X) |
| 436 | Delay | 74107(2X) |
| 438 | Gate | 7410 |
| 32 | Recognition | 7485(3X) 7420(1X) |
| 34 | Recognition | 7486(3X) 7420(1X) |
| 55 | Comparator | 7485(5X) 74S20 |
| 42 | Device Parity | 74S280(2X) 74157(1X) |
| 66 | Register | 74174(4X) |
| 61 | Register | 74174(3X) |
| 97 | Parity Generator | 74S280(4X) |
| 85 | DA Register | 74174(3X) 7474(1X) |
| 121 | Load Control | 7474(4X) |
| 122 | Check | 7474(4X) |
| 105 | Multiplexer | 74LS257(4X) |

What is claimed is:

1. A controller system for use in a data processing system having a CPU, a main memory, a high speed memory and a cache bus, the controller system having a high speed controller, a drive controller and a device bus coupled to and between said high speed controller and said drive controller for handling data, address and control signals, said drive controller coupled to a plurality of secondary storage devices each having storage media, the system bus coupled to and between the CPU and the high speed controller and having the same data, address and control formats as the device bus where said data is the data stored on the device storage media, the high speed memory coupled to and between the CPU and the main memory, and the cache bus coupled to and between the high speed memory and the high speed controller for handling data, address and control signals comprising (a) (1) means for varying the timing of the control and address signals provided by the drive controller on the device bus for timing compatibility with the control and address signals on the system bus whereby the drive controller seizes control over the system bus to initiate a transfer of data between the storage devices and the system bus, (2) the drive controller including means for assembling and reformatting bytes of data from the storage media and producing address and control signals in the format of the system bus whereby such data is transferred between the storage devices and the system bus, (b) (1) means for varying the timing of the control and address signals provided by the system bus when the drive controller has relinquished control over the system bus upon completion of said data transfer, (2) said drive controller including means for accepting address and control signals in the format of the system bus, and (c) means for transferring address, data and control signals between the device bus and the cache bus.

2. The controller system of claim 1 in which there is provided timing and control interface means coupled between the device bus and the cache bus for transferring address, control and data signals between said device bus and said cache bus.

3. The controller system of claim 2 in which said timing and control interface means includes first gating means for detecting when the cache bus is ready to accept data, and therefore causing the high speed controller to gate out temporarily stored device data for transfer to the cache bus.

4. The controller system of claim 3 in which there is provided first register means for providing said temporary storage of said device data.

5. The controller system of claim 2 in which said timing and control interface means includes second gating means for detecting when the cache bus is ready to transfer data to the device, and thereafter causing the high speed controller to accept data from the cache bus for temporary storage and then for transfer to the device.

6. The controller system of claim 5 in which there is provided second register means for providing said temporary storage of said cache data.

7. The controller system of claim 1 in which said drive controller includes means for producing status and error information for the CPU when the drive controller has relinquished control over the system bus.

8. The controller system of claim 1 in which there is provided gating means for selectively transferring and temporarily storing data from the device bus for transfer to the system bus in accordance with the timing requirements of the device and system busses.

9. The controller system of claim 1 in which there is provided means for changing an address format from the device bus into a corresponding address format required by said cache bus.

10. The controller system of claim 9 in which said address changing means includes address extension registers for storing the information necessary to extend said address format received from the device bus into corresponding address format required by the cache bus.

11. The controller system of claim 1 in which there is provided means for converting the data word format of the device bus into a corresponding data word format required by the cache bus, and means for converting the data word format of said cache bus into a corresponding data word format required by said device bus.

12. The controller system of claim 11 in which said converting means includes means for changing a single word format of the data of the device bus into a double word format required by the cache bus.

13. The controller system of claim 12 in which said converting means includes means for changing a byte of data from the device bus into a double word format required by the cache bus.

14. The controller system of claim 13 in which there is provided register means for loading bytes of data from said device bus into said register means and for transferring the data to said cache bus when said register means is full, and additional register means for loading bytes of data from said cache bus awaiting transfer to said device bus.

15. The controller system of claim 12 in which there is provided multiplex means for splitting the data format used by the cache bus into bytes for controlling the transfer of data onto the device bus.

* * * * *